US010970211B2

(12) United States Patent
Davenport et al.

(10) Patent No.: US 10,970,211 B2
(45) Date of Patent: Apr. 6, 2021

(54) TECHNIQUES FOR REDUCING SIZE OF LOG RECORDS

(71) Applicant: EMC IP Holding Company LLC, Hopkinton, MA (US)

(72) Inventors: William C. Davenport, San Diego, CA (US); Socheavy D. Heng, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 13 days.

(21) Appl. No.: 16/530,237

(22) Filed: Aug. 2, 2019

(65) Prior Publication Data

US 2021/0034520 A1 Feb. 4, 2021

(51) Int. Cl.
*G06F 12/08* (2016.01)
*G06F 12/0804* (2016.01)
*G06F 12/10* (2016.01)
*G06F 16/172* (2019.01)

(52) U.S. Cl.
CPC ......... *G06F 12/0804* (2013.01); *G06F 12/10* (2013.01); *G06F 16/172* (2019.01); *G06F 2212/1044* (2013.01); *G06F 2212/608* (2013.01); *G06F 2212/657* (2013.01)

(58) Field of Classification Search
CPC .... G06F 12/0804; G06F 12/10; G06F 16/172; G06F 2212/1044; G06F 2212/657; G06F 2212/608
See application file for complete search history.

(56) References Cited

U.S. PATENT DOCUMENTS

| 10,380,141 | B1* | 8/2019 | Chepel | G06F 11/1471 |
| 2012/0239869 | A1* | 9/2012 | Chiueh | G06F 12/0246 |
| | | | | 711/103 |
| 2018/0260136 | A1* | 9/2018 | Huo | G06F 3/068 |
| 2018/0293174 | A1* | 10/2018 | Song | G06F 12/1009 |

* cited by examiner

*Primary Examiner* — Hiep T Nguyen
(74) *Attorney, Agent, or Firm* — Muirhead and Saturnelli, LLC

(57) ABSTRACT

Techniques for processing I/O operations include: receiving a write I/O operation that writes first data to a target location, wherein the target location is represented as a logical device and offset within a logical address space of the logical device; storing a log record for the write I/O operation in a log file; and performing first processing of the log record. The log record includes log data, comprising the first data, and a log descriptor. The log descriptor includes a target logical address for the target location in a file system logical address space. The log descriptor includes a first value denoting the binary logarithm of an extent size of the first logical device. The first processing includes flushing the log record from the log file to store the first data of the log record on an extent of physical storage provisioned for the logical device.

20 Claims, 13 Drawing Sheets

TECHNIQUES FOR REDUCING SIZE OF LOG RECORDS

BACKGROUND

Technical Field

This application generally relates to data storage.

Description of Related Art

Systems may include different resources used by one or more host processors. Resources and host processors in the system may be interconnected by one or more communication connections, such as network connections. These resources may include, for example, data storage devices such as those included in the data storage systems. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing I/O operations. A write I/O operation is received that writes first data to a target location, wherein the target location is represented as a first logical device and a first offset within a first logical address space of the first logical device. A log record for the write I/O operation is stored in a log file, wherein the log record includes log data and a log descriptor, wherein the log data includes the first data, wherein the log descriptor includes a target logical address for the target location in a file system logical address space, wherein the target logical address is determined by mapping the target location to a corresponding logical address in the file system logical address space, wherein the log descriptor includes a first value denoting the binary logarithm of an extent size of the first logical device. First processing of the log record is performed. The first processing includes flushing the log record from the log file to store the first write data of the log record on a first extent of physical storage provisioned for the first logical device. The extent size may denote a size of the first extent of physical storage allocated for storing content of the first logical device, and wherein the first extent may be mapped to a subrange of the file system logical address space. The first logical device may be implemented as a file in a file system having the file system logical address space. The first processing may include determining the extent size of the first logical device using the first value of the log record; and determining, in accordance with the first value and the extent size, a base address in the file system logical address space for the first logical device, wherein the base address denotes a starting logical address in the file system logical address space for the first extent of the first logical device. The first processing may include determining the first offset using the base address for the first logical device and using the target logical address of the log record for the write I/O operation, wherein the base address is determined by said first processing.

In at least one embodiment, processing may include storing at least one of the base address, the first offset and the extent size as first metadata associated with the first logical device. Recovery processing may be performed using the at least one of the base address, the first offset and the extent size stored as the first metadata associated with the first logical device, wherein the recovery processing may include recovering second metadata of the file system. The second metadata may be included in an index node (inode) of the file system, wherein the inode may be uniquely associated with the file used to implement the first logical device.

In at least one embodiment, prior to performing said receiving, said storing and said first processing, other processing may be performed that includes creating a file system object in the file system for the first logical device. Creating the file system object may include creating the inode and mapping the inode into the file system logical address space; and allocating the first extent and mapping the first extent into the file system logical address space. Verification processing or consistency checking in connection with the first logical device may be performed, that uses at least one of the base address, the first offset and the extent size as first metadata associated with the first logical device.

In at least one embodiment, the first processing may include committing a first transaction of a plurality of write I/O operations including the write I/O operation. Committing the first transaction may include writing a plurality of log records, including the log record, to the log file. Responsive to committing the first transaction whereby the plurality of log records have been written to the log file, a response may be sent to a client that requested the first transaction has completed.

In at least one embodiment, the file system logical address space may be a range of logical addresses from a starting address to an ending address, wherein a binary logarithm of the ending address is J, and wherein the first value may be stored in a field of the log record for the write I/O operation and the first field may have a size determined in accordance with J. The extent size may be a power of 2. The extent size may be greater than a specified minimum extent size, and wherein the minimum extent size may also be a power of 2. A base address in the file system logical address space for the first logical device may denote a starting logical address in the file system logical address space for the first logical device. The base address may be a power of 2 and the base address may also be an integer multiple of the extent size of the first logical device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
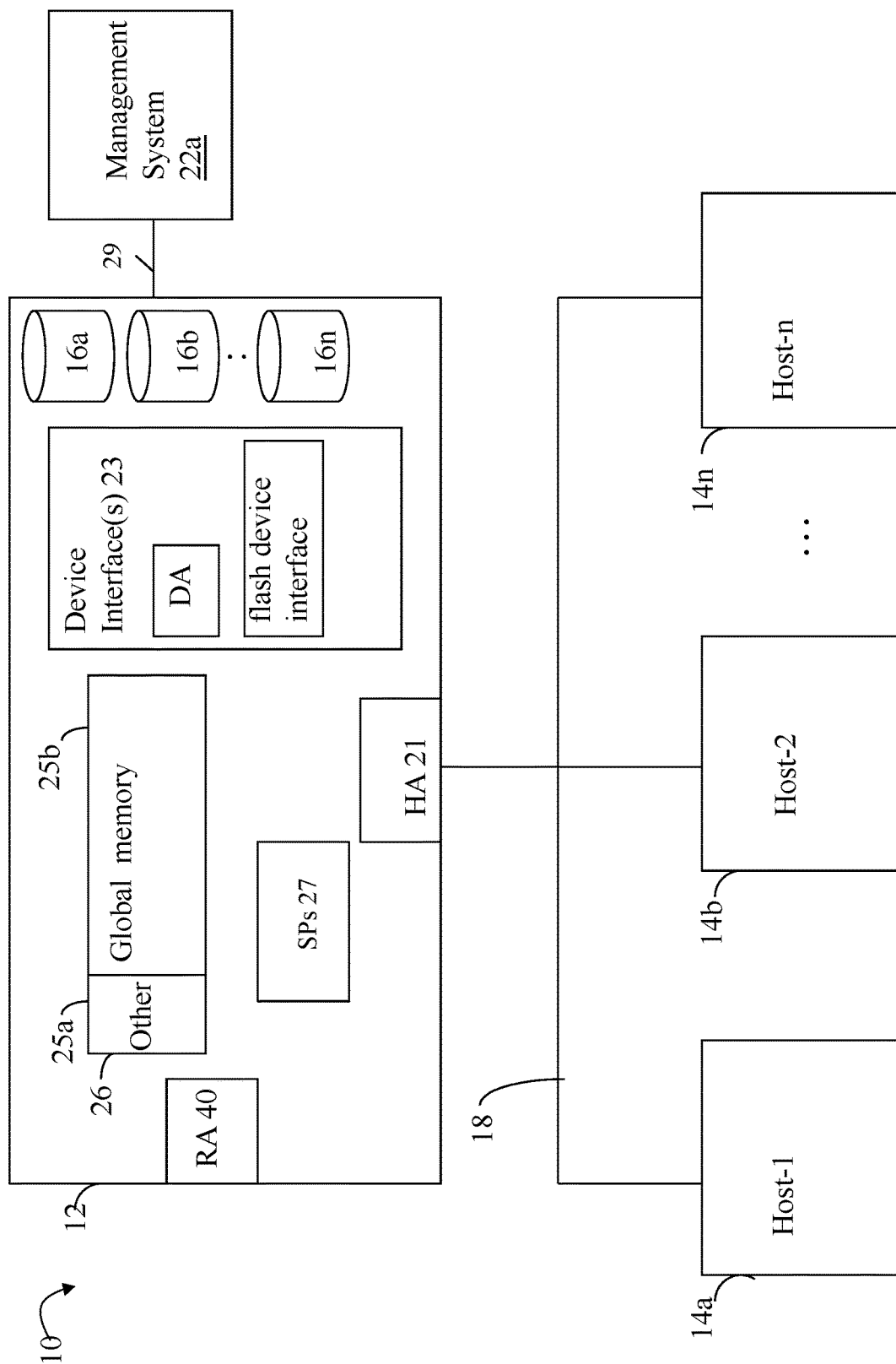
FIG. 1 is an example of components that may be included in a system in accordance with the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors.

The data storage system 12 may be a data storage array including a plurality of data storage devices 16a-16n. The data storage devices 16a-16n may include one or more types of physical data storage devices (PDs or physical devices denoting backend, non-volatile storage) such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache (e.g., data cache) that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation. An I/O operation, such as to read or write data, may identify a logical device, such as a LUN, and an offset denoting a logical address or location on the LUN. Data storage at the LUN and offset may be stored at a physical storage location on one or more PDs. Thus, processing performed on the data storage system for the I/O operation may include mapping the LUN, offset to its corresponding physical storage location on one or more PDs of the data storage system.

In at least one embodiment in accordance with the techniques herein, data read from, and/or data written to PDs denoting the backend non-volatile physical storage devices may utilize a data cache that is a form of fast memory, such as a form of solid state storage. The data cache, also sometimes referred to herein as a cache, may be implemented, for example, using a portion of global memory 25b as noted above. In connection with a read I/O operation, processing may include first determining whether the requested read data is stored in the cache thereby denoting a read cache hit. If there is a read cache hit, the requested read data may be retrieved from cache and returned to the requester without having to actually access the data on the PDs thereby greatly reducing the response time for the read I/O operation. If the requested read data is not in cache thereby denoting a read cache miss, the requested read data is read from its corresponding location on the one or more PDs, stored in the data cache, and then returned to the requester. In connection with a write I/O operation, the write data is first written to the cache in a cache location and marked as write pending (WP). Once the write data has been stored in cache, an acknowledgement regarding completion of the write operation may be returned to the requester even without actually writing the write data out to its corresponding location on the one or more PDs. At some time later, the WP data may be destaged from the cache to its location on the one or more PDs. Once the WP data has been destaged from cache, the cache location including the write data may be updated to clear the WP state, and more generally, the cache location may be reused.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Each of the different adapters, such as HA 21, DA or disk interface, RA, and the like, may be implemented as a hardware component including, for example, one or more processors, one or more forms of memory, and the like. Code may be stored in one or more of the memories of the component for performing processing.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

An embodiment of a data storage system in accordance with the techniques herein may include one or more data facilities or services such as may be performed with respect to physical and/or logical data storage entities of the data storage system. For example, a LUN and a file are each a storage entity for which the data storage system may include one or more data replication facilities. For example, a snapshot facility may be a local data replication facility or service on the data storage system that may be used to create one or more snapshots of a file, file system, LUN, and the like. As known in the art, a snapshot technique may be used by a snapshot facility to create a logical or virtual copy of the data source, such as a file, file system, or LUN. For example, a snapshot facility may be used in an embodiment in accordance with the techniques herein to create a snapshot characterized as a logical point in time copy of data of a data source. A snapshot of a source LUN, for example, may appear like a normal LUN and may be used for backup, testing, read operations, write operations, and the like. Snapshots may rely, for example, on copy on first write (COFW) and other techniques to track source LUN changes from the time when a snapshot was created. Any writes to the source may result in processing by snapshot software, for example, to copy the original data prior to changes into another area of storage. With respect to COFW techniques, the COFW occurs only once for each data block modified on the source. Since only changed data blocks of the source are retained rather than make a complete copy of the source, the storage capacity required to implement snapshots may be considerably less than that of the source. Though a snapshot of a source LUN may be presented to a user as a separate LUN along with the current source LUN, a snapshot of the source LUN is a virtual point in time copy and requires access to the unchanged data in the source LUN. Therefore failures affecting the source LUN also affect the snapshot of the source LUN. Snapshots of a source LUN may be contrasted, for example, with the physically complete bit-for-bit replicas of the source LUN.

In connection with the foregoing, COFW is only one example of a technology or technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary source LUN are redirected (written) to a new location.

A data storage system may support one or more different types of logical devices presented to a host or other client as LUNs. For example, a data storage system may provide for configuration of thick or regular LUNs and also virtually provisioned or thin LUNs. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

In at least one embodiment, thin or virtually provisioned LUNs may be implemented with and organized as a type of mapped LUN. In such an embodiment, each thin LUN, or more generally, any suitable type of logical device or LUN, may be implemented as a file of a file system. It will be appreciated by those of ordinary skill in the art that techniques herein are not limited to use with thin LUNs and may more generally be used in connection with other types of LUNs.

Figure 2:
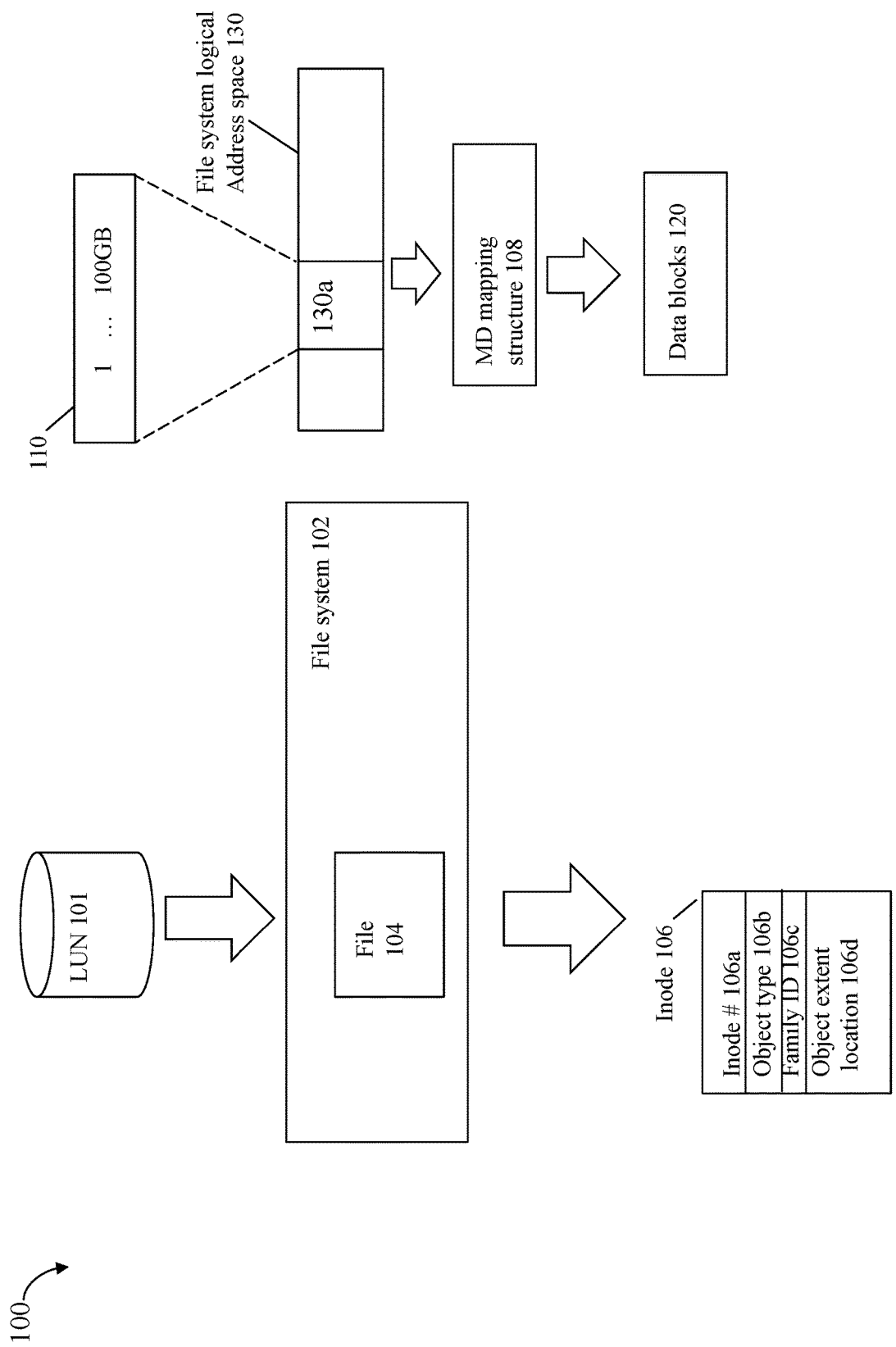
FIG. 2 is an example illustrating a thin or virtually provisioned LUN that may be implemented using a file in an embodiment in accordance with the techniques herein.

Referring to FIG. 2, shown is an example 100 illustrating a thin LUN 101 that may be used in connection with an embodiment in accordance with the techniques herein The example 100 includes LUN 101 implemented as file 104 on file system 102. The LUN 101 may be, for example, a 100 GB capacity thin or virtually provisioned LUN having a logical address space as denoted by 110. In at least one embodiment, the 100 GB LUN 101 may be implemented using file 104 whereby the file 104 is a 100 GB file. In this manner, a relative file offset in the file 104 corresponds to a logical address or offset in the logical address space 110 of the LUN 101. Consistent with discussion elsewhere herein, physical storage for the thin LUN may be allocated in chunks of any suitable size in an on-demand manner. For example, the first time there is a write to a target logical address of the thin LUN's logical address space, the physical storage for the target logical address may be allocated and mapped to the thin LUN's logical address space. For example, a block of physical storage (at which the write data is stored) may be mapped to a particular logical address, offset or location of the LUN's logical address space.

In at least one embodiment in accordance with the techniques herein, the file system 102 may be a UNIX-style file system. In such a file system, an index node (inode) is a data structure used to represent a filesystem object, such as a directory or file 104. In connection with thin LUN 101 implemented as file 104, the inode 106 for the file 104 stores metadata (MD) about the file 104 such as various file attributes and information. Generally, each inode associated with a particular file system object stores attributes and information about the file system object. For example, in at least one embodiment, each inode, such as inode 106, may be structure including an inode number 106a, an object type 106b, a family identifier (ID) 106c, object extent location 106d, and possibly other information.

The inode number (#) 106a of the structure 106 associated with the file 104 may be unique with respect to other inode numbers of other inode structure instances. A different inode number may be associated with each different file system object. In this manner, an inode number may be used to uniquely distinguish among different inodes and file system objects. In at least one embodiment, an additional mapping may be maintained that maps each LUN to its corresponding inode number where the additional mapping may be used, for example, in servicing I/Os directed to a particular LUN and LBA (logical block address).

The object type 106b may denote the particular type of file system object associated with the inode structure 106. For example, as noted elsewhere herein, inode types in one embodiment may include a file and a directory. In this example 100, the inode 106 is of type file denoting the file 104 used to implement the LUN 101 as a file system object in the file system 102.

The family ID 106c may be a unique ID associated with the LUN and all its associated related logical objects or related file system objects. For example, in at least one embodiment, a snapshot of LUN 101 may also be implemented as a second different file, file 2, in the file system 102. Although not illustrated in FIG. 2, the inode for the file 2 may include a different inode number than inode 106 (associated with file 104) and the inode for the file 2 may also include the same family ID as the inode 106.

The object extent location 106d may be a logical address location or offset in the file system 102's logical address space denoting the starting or base logical address for the file system object. Element 130 may denote the entire logical address range of the file system 102. In at least one embodiment, the logical address range 110 of the particular file system object 104 implementing the LUN 101 may map to a corresponding portion 130a of the file system logical address range 130. The starting or base address for LBA 0 of the LUN 101 may map to a corresponding base or starting address, such as N, within 130. In this case, the LUN's logical address space 110 is mapped to corresponding FS logical addresses N through M−1, where M denotes the last logical address in the LUN's LBA range 110. In such a case, any LBA of the LUN 101 may be mapped to a corresponding logical address in the file system logical address space 130 by adding the based logical address N. As described in more detail in following paragraphs and figures, each particular file system (FS) logical address in 130 may be mapped, using the MD (metadata) structure 108, to the data block locations storing the contents for the FS logical address. The data block locations may denote the allocated physical storage data blocks (DBs) 120 storing content for a FS logical address, such as for a FS logical address in the portion 130a for the LUN 101.

The MD mapping structure 108 may include multiple layers of MD nodes that ultimately map to data blocks (DBs) (e.g., physical storage locations) including data or contents. In at least one embodiment described in more detail herein (e.g., FIGS. 6 and 7), the structure 108 may be a multiple layer mapping structure accessed to convert a logical address of the file system 102 (and thus of the file 104 and thin LUN 101) to a physical address of a data block. In at least one embodiment, the structure 108 may include multiple levels or layers of MD nodes arranged in a hierarchy.

In connection with the thin LUN 101 in at least one embodiment, the first time there is a write to an LBA of the LUN's logical address space 110, there is no existing data block or physical storage mapped to the LBA. As a result, in response to the first write to the LBA, physical storage in the form of a data block may be allocated and mapped to the LUN's logical address space. In this manner, the structure 108 may map to DBs in a dynamic manner as storage is allocated responsive to first writes to LBAs in the logical address space 110 of the thin LUN 101.

Figure 3:
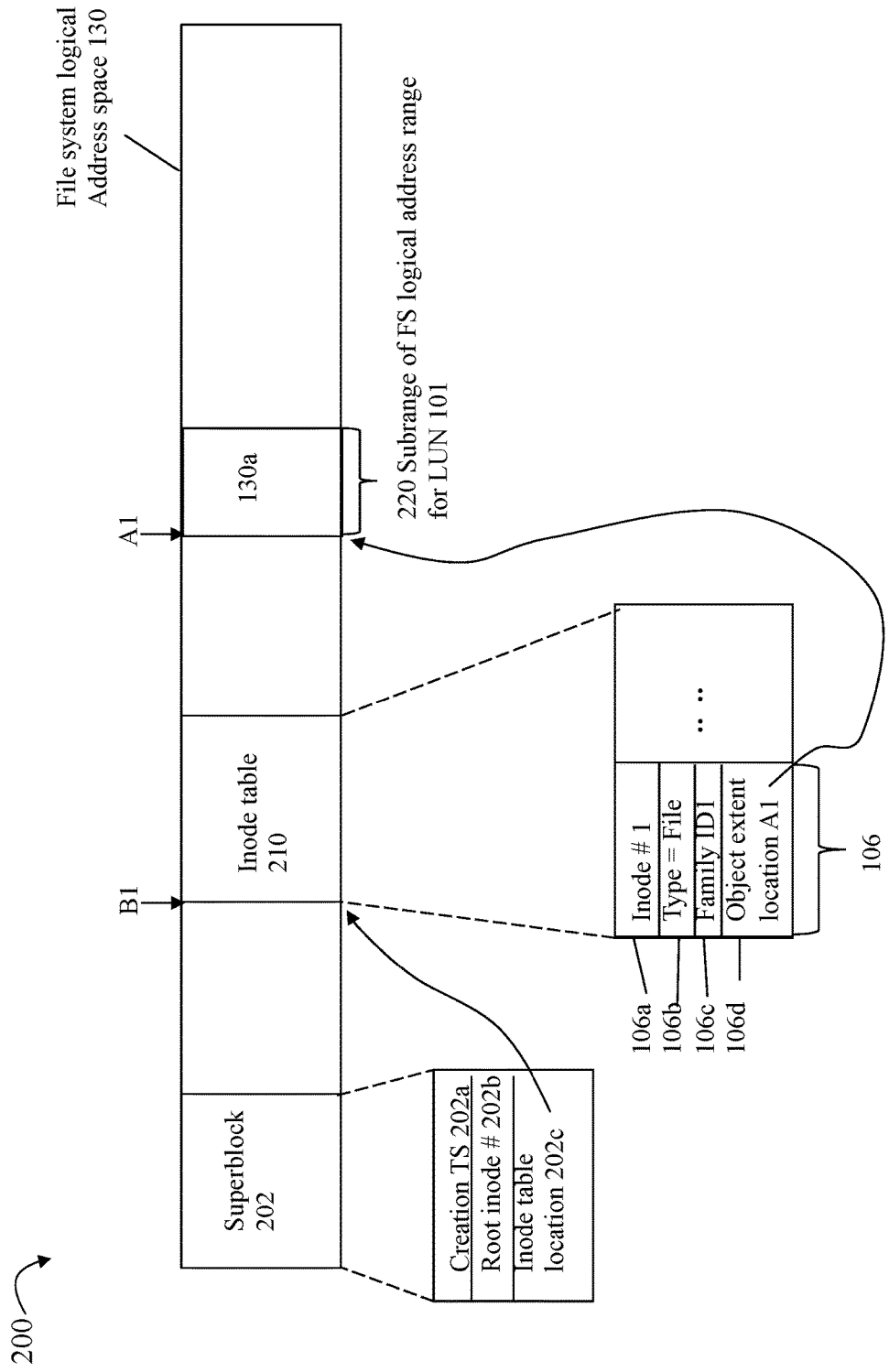
FIGS. 3 and 9 are examples illustrating a file system address space in embodiments in accordance with the techniques herein.

Referring to FIG. 3, shown is an example of a logical address space of a file system, such as file system 102 of FIG. 2, in an embodiment in accordance with the techniques herein. The example 200 illustrates that the FS logical address space 130, such as for the file system 102, may include address space offsets or locations mapped to various structures of the file system 102.

The example 200 illustrates in more detail various structures that may be mapped to the FS logical address space 130 of FIG. 2. The FS logical address space 130 may include a superblock structure 202 including various information about the file system. For example, the superblock 202 may include a creation timestamp (TS) 202a denoting when the file system is created, a root inode number 202b associated with the file system's root directory, an extent or offset 202c, or more generally, a logical address within the FS address space 130 of where the inode table 210 is stored. In this example, the entry 202c indicates that the inode table 210 is stored at logical address, offset or location B1 in the FS logical address space 130.

The inode table 210 may be a table with an entry for each inode structure, such as the structure 106. As illustrated in the example 200, the structure inode 106 is for the LUN 101 implemented as the file 104 of the file system 102. Although not explicitly illustrated, the inode table 210 may also include an entry of the inode structure for the root inode #202b. The inode structure 106 includes an inode number (#) 1 106a, has an object type 106b of file, has a family ID 106 of "family ID1", and has an object extent location 106d of A1. In this example, element 106d indicates that the base or starting offset (e.g., logical address) within the FS logical address space for LBA 0 of LUN 101 is A1. Element 130a denotes the logical address space of LUN 101 having a base logical address of A1 whereby the content or data of the LUN 101 is stored at data blocks mapped to FS logical addresses in the portion 130a.

Element 220 denotes the subrange of the FS logical address space 130, where the subrange maps to the logical address range of the LUN 101 and also where the subrange maps to the data or contents for the LUN 101. For example, assume DATA1 is stored at LUN 101, LBA 0. To obtain the contents or data stored at LUN 101, LBA 0, an embodiment in accordance with the techniques herein may determine the corresponding FS logical address for LUN 101, LBA 0, which in this example is A1. The desired LBA or offset, 0 in this case, may then be added to the base address to determine the desired FS logical address of A1. As generally described above and in more detail elsewhere herein, the FS logical address A1 may then be mapped, using the MD mapping structure 108, to the data block including the data or content stored at the FS logical address A1.

In at least one embodiment, space for the file system 102 may be provisioned in physical storage portions referred to as slices which are then mapped into the FS logical address space 130. The file system 102 may then allocate blocks of storage, such as for inodes, FS objects such as the LUN 101, and the like, as needed. Physical storage for the file system may be provisioned in slices of storage from one or more RAID (redundant array of inexpensive disks) groups. A RAID group may be characterized as a logical storage entity defined from a group of physical storage devices, such as rotating disk drives, flash-based storage devices or other forms of non-volatile back end data storage devices. Physical devices of a RAID group are logically bound together to represent contiguous data storage space for applications. A RAID group represent a logically contiguous address space distributed across a set of physical storage devices of the group. Each physical storage device is subdivided into pieces used to spread the address space of the RAID group across the group (along with parity information if applicable to the RAID level). The physically contiguous pieces of the physical storage devices that are joined together to create the logically contiguous address space of the RAID group are called stripes. Stripes may form blocks and blocks may be allocated to create logical representations of storage space for use by applications within a data storage system. Each slice may denote an amount of storage, such as 256 MB (megabytes) although any suitable size may be used.

Figure 4:
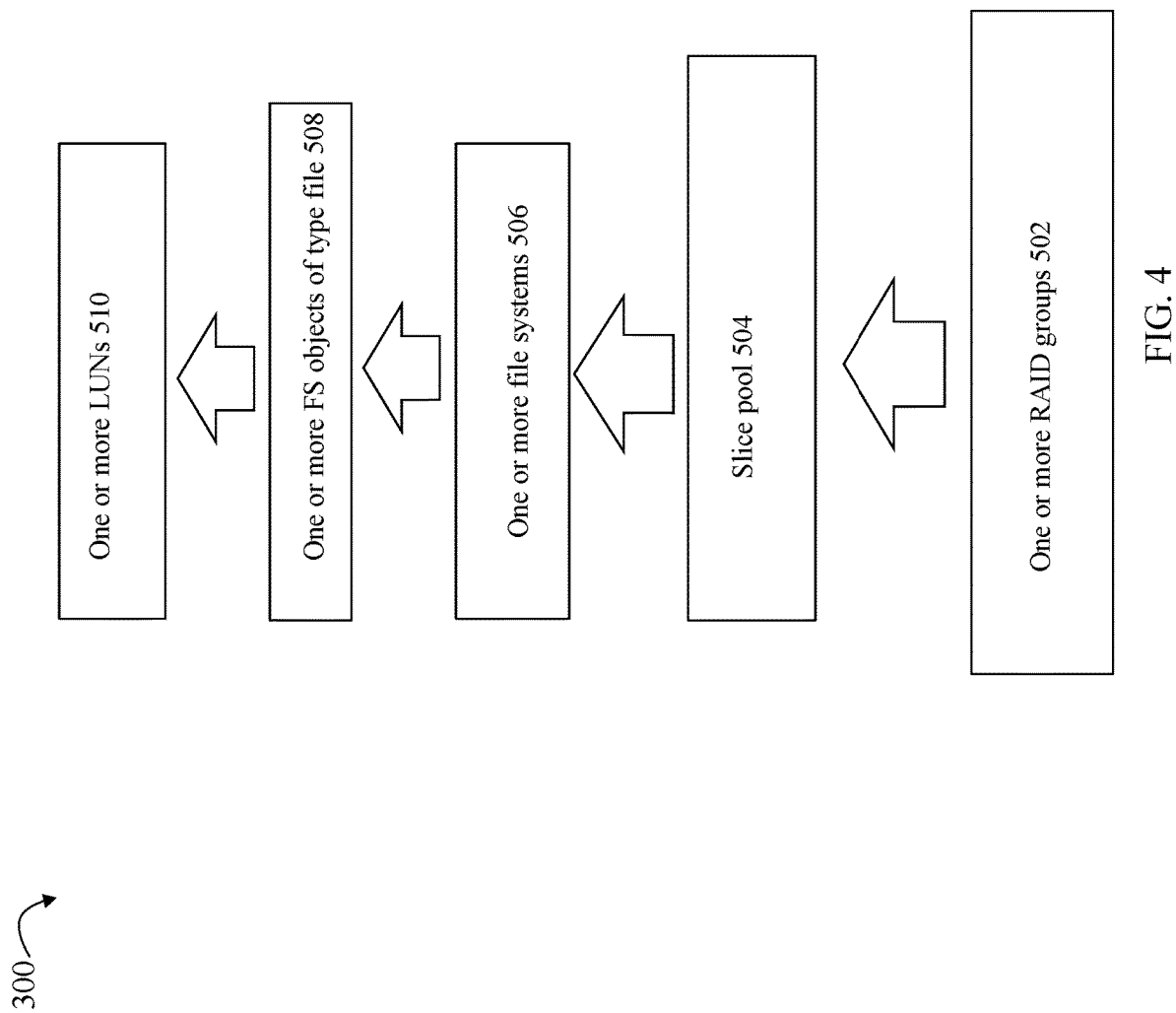
FIG. 4 is an example illustrating how storage may be configured and mapped to file system objects, such as files implementing logical devices, in an embodiment in accordance with the techniques herein.

Referring to FIG. 4, shown is an example representing generally how storage may be configured for use with the techniques herein. Element 502 denotes the one or more RAID groups as described above providing the physical storage from which slices of storage are allocated and included in slice pool 504. Slices from slice pool 504 may then be generally mapped, using possibly one or more other logical layers, into one or more file systems 506, such as file system 102 of FIG. 2. In each of the file systems of 506, one or more FS objects 508 may be created. For example, FS objects of type file may be created to implement corresponding LUNs 510. Consistent with other discussion herein, an FS object of type file of 508 (e.g., file 104 of FIG. 2) may implement a single corresponding LUN (e.g., LUN 101).

With reference back to FIG. 3, inodes, which include the metadata for a storage object such as a file, may be stored alongside the data that comprises the content of the file in a physical storage media (e.g. disks) in a data storage system. As such, physical storage devices may store both the user or file data itself and the inode and other FS MD mapped into the FS logical address space 130.

Figure 5:
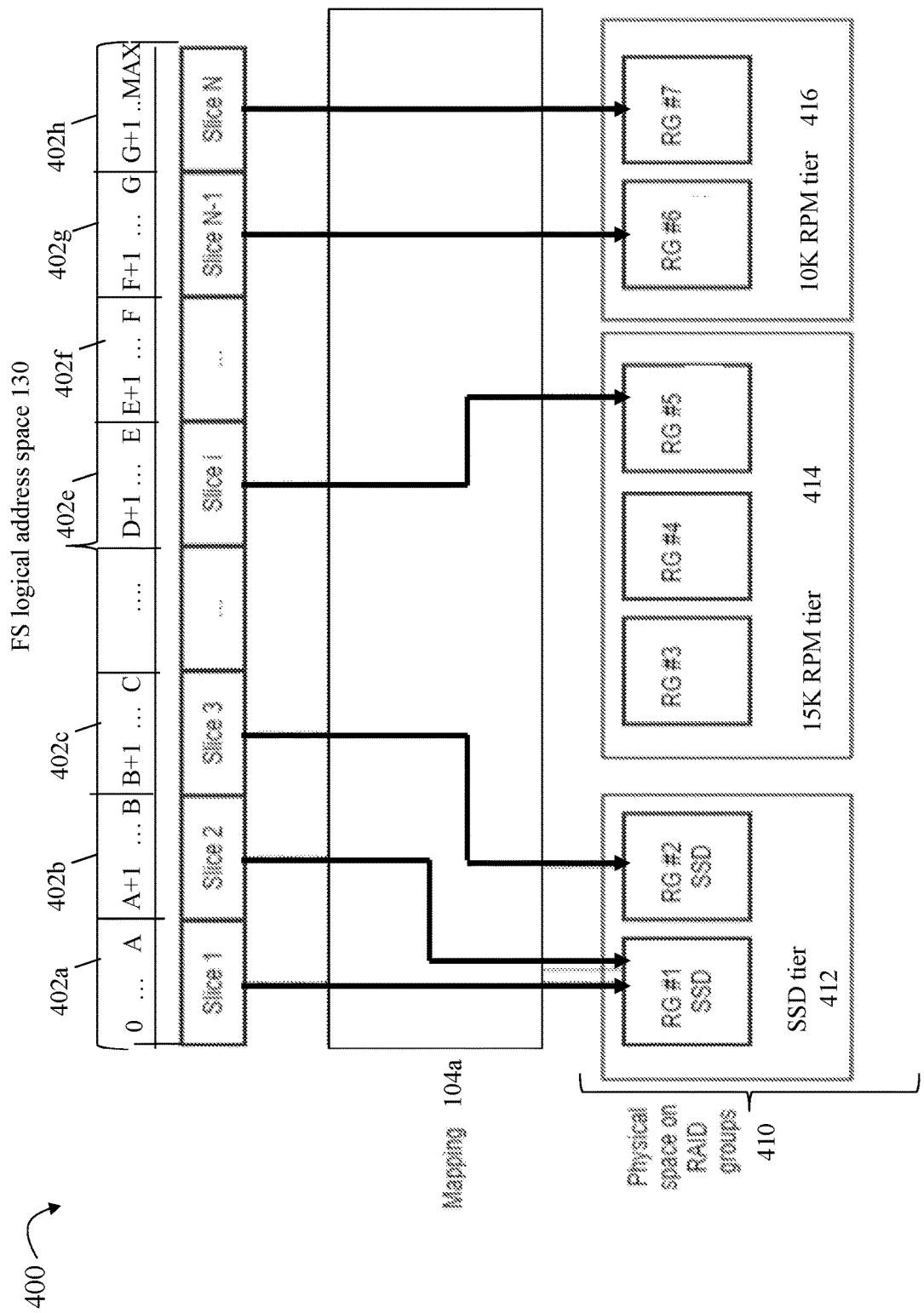
FIG. 5 is an example illustrating mapping of logical addresses to physical storage in an embodiment in accordance with the techniques herein.

Referring to FIG. 5, shown is an example illustrating a logical to physical mapping for a FS logical address space in an embodiment in accordance with the techniques herein. The example 500 illustrates how the FS logical address space or range 130 is mapped via mapping layer 104a to different slices, segments or more generally, portions of physical memory of non-volatile physical storage devices (110) providing back-end data storage, such as denoted by PDs 16a-n in FIG. 1. The mapping layer 104a may used the MD mapping structure 108 as noted above and described in more detail elsewhere herein.

The example 400 include storage tiers 412 (SSD tier), 414 (15K RPM tier) and 416 (10K RPM tier) comprising the PDs 410. Element 130 may denote the FS logical address space as described above, having a starting logical address, block or offset of 0, and an ending maximum logical address, MAX. The FS logical address space 130 in the example 400 is partitioned into equal logical address space portions (denoted by 402a-h) where each of the portions 402a-h is mapped to region of physical storage, also referred to as slices or segments, on the different PDs of different ones of the storage tiers of 410. Data storage system software may periodically remap portions of the FS logical address space 130 to keep the most actively used or accessed portions of 402a-n on slices of the highest performance tier 412 in efforts to maximum data storage system I/O performance. As shown in FIG. 5, PDs of the tiers 412, 414 and 416 may be configured into RAID groups (denoted as RG #1-7 in FIG. 5) each having a suitable RAID level to provide data protection.

Data that may be written to a first LBA of a LUN, such as LUN 101, that is mapped into a target logical address of the FS logical address space 103. In at least one embodiment, an additional mapping may be maintained that maps each LUN to its corresponding inode number. Using the inode structure for the LUN's inode number, the base logical address for the LUN may be determined from the object extent location field 106d whereby the target logical address in the FS logical address space 103 may be determined by adding the first LBA to the based logical address. The data written to the target logical address is then stored on the PDs, or more generally, back-end non-volatile storage devices of 410. The MD mapping structure 108 corresponding to the mapping layer 104a may be updated to reference the physical location or data block at which the data is stored where the MD mapping structure maps the data block of containing the data to the target logical address within the FS logical address space 130. More generally, any logical address of the FS logical address space 130 may be mapped by the mapping layer 104a (and thus the MD mapping structure thereof) to a data block of physical storage in 410.

When performing various data storage services or processing I/O operations that access data stored on a LUN, data read from and/or written to a LUN may be processed using the typical I/O or data path such as described herein. For example, consistent with other discussion herein, when reading data from a LUN of the data storage system, the data may be read from the LUN, stored in the cache of the data storage system, and then further read from the cache for use by one or more other components of the data storage system. For example, data may be read from a LUN in response to a read I/O from a client, such as an external host. The data may result in a cache miss wherein the requested read data is read from a backend PD and then stored in the cache. The read data stored in the cache may then be read by another component, such as a front end component that is an HA or an FA, that returns the read data from the cache to the client that issued the read I/O operation.

As noted above and elsewhere herein, the MD mapping structure 108 of the mapping layer 104a, as well as other MD (e.g., inode table 210) that may be mapped into the FS logical address space, may be used in order to access and read the associated user data stored on the LUN and thus provisioned storage from the backend PDs. For example, reading the user data stored at LUN A, LBA 5 from the PDs includes reading MD as well as user data into the cache if such MD and user data is not already located in the cache. For example, MD (e.g., portions of the MD mapping structure 108) describing the physical storage location for user data stored at LUN A, LBA 5 may be read from a backend PD and stored in the cache. Subsequently, the cached MD may be read to determine the physical storage location on a backend PD for the user data stored at LUN A, LBA 5. Processing may proceed to read such user data for LUN A, LBA 5 from the backend PD into the cache. In performing this processing, such user data and MD may remain in the cache until removed, for example, based on the particular cache management policy of the cache.

Generally, it may be desirable to keep or retain in the cache as much of the MD as possible that describes the location of where data is stored. Furthermore, a data storage system may generally attempt to store in cache as much MD as possible, where such MD may be used to map a logical address of the FS logical address space 103 to its corresponding data block. In some embodiments, there may not be a sufficient amount of cache to store all the needed MD, such as for the LUN A and other LUNs of the system, in the cache. As a result, the data storage system may store the more frequently accessed MD for the LUNs in the cache with remaining MD for the LUNs stored on the backend PDs. As may be needed such as in connection with servicing I/Os, the MD for the LUNs stored on a backend PD may be loaded into the cache. In this case, a data storage system may use a paging mechanism for paging MD into cache from PDs and for storing cached MD to the PDs in order to reduce the amount of cache consumed with storing all desired the MD. The data storage system may also use paging in connection with mapping user data stored on the PDs in and out of memory.

Paging is generally known in the art and commonly used in connection with memory management, such as for virtual memory management. In connection with virtual memory management, paging is a method of writing data to, and reading it from secondary storage, such as physical disk or other non-volatile storage, for use in primary storage, such as main memory. In a memory management system that takes advantage of paging, the operating system reads data from secondary storage in blocks or chunks that may also be referred to as pages. Since the amount of the primary storage is typically much smaller than the amount of data on secondary storage, it is not possible to store all such data in the primary storage. Thus, data may be read from secondary storage and stored in the primary storage as needed. When the primary storage no longer has available locations and another primary storage location is needed for storing new or additional data not already in primary storage, techniques may be used to select a primary storage location whereby any data in the selected primary storage location may be overwritten with the new or additional data. Prior to overwriting the selected primary storage location with the new or additional data, the current data of the selected primary storage location may be written out, as needed, to its corresponding secondary storage location (e.g., written out if the primary storage location copy is more recent or up to date than the secondary storage copy). In such a case, the current data in the selected primary location may be characterized as paged out of the primary memory (e.g., available on secondary storage but not primary storage) and the new or additional data may be characterized as paged in to the primary memory. The new or additional data is also stored on the secondary storage.

In connection with storing MD in the cache, paging may be performed in a similar manner where the primary storage is the cache and the secondary storage is the physical storage device or PDs (e.g., disk or flash-based non-volatile backend storage accessed by the DAs). Thus, MD may be retrieved from back-end PDs as needed and stored in the cache, such as for servicing read operations requesting user data associated with the MD. Once the MD is in cache, such MD may be removed from cache (e.g., evicted, removed, overwritten, paged out, and the like) as cache locations storing such MD are needed in connection with other subsequent processing. A page may refer to a single unit or amount of memory located in the cache, whereby MD stored in each page in the cache may be brought into the cache (e.g., paged into the cache) and also paged out of (e.g., evicted from) the cache as may be needed. Various techniques may be used for general cache management (e.g., eviction policy for selecting data of cache slots for removal from cache, flushing policy for determining when and/or how much write pending data to flush from cache to non-volatile storage, and the like).

In at least one embodiment, a page table may be used to map or perform address translations of a physical storage location or address of a MD page on a PD (e.g., also sometimes referred to as an on-disk address or location) to a cache address or location, if that particular MD page is currently loaded in cache. Thus, the page table may be queried to return a cache location of a desired MD page based on the physical location or address of the MD page as stored on a back-end PD. If the particular MD page having a specified physical location on a PD is not currently stored in cache, the page table will not contain any mapping to a corresponding cache location. In such a case, a read or cache miss results as described elsewhere herein. Responsive to the read or cache miss with respect to a particular MD page located at a particular on-disk address or location, processing may be performed to page in the MD page (e.g., read the MD page from physical storage of the PD and store the MD page in cache).

In some systems, multiple MD pages referencing or pointing to each other may need to be accessed in a particular order and read in a serialized manner in order to ultimately access the desired data, such as user data, referenced by the final MD page. In such a case, all the multiple MD pages need to be in cache or otherwise paged in from PDs in order to access the desired data, which may or may not also be in cache and thus may also need to be paged into the cache.

In at least one embodiment, the MD mapping structure 108 of the FIG. 2 corresponds to the mapping layer 104a of FIG. 5. Thus MD mapping structure 108 may be used as the mapping layer 104a to map FS logical addresses of 130 to data blocks. In at least one embodiment, the MD mapping structure 108 may be in the form of a tree having a plurality of levels where MD nodes of the tree at the different levels are traversed in connection with obtaining data stored at a particular logical address of the FS logical address space 130. More generally, the MD mapping structure may be in the form of any ordered list or hierarchical structure. In at least one embodiment, the MD mapping structure of the mapping layer may be in the form of a tree having a specified number of levels, such as 4 levels, including a first level of one or more root nodes, a second level of one or more top nodes, a third level of one or more mid level nodes, and a fourth or bottom level of leaf nodes.

Each of the MD page leaf nodes may point to, or reference (directly or indirectly) one or more pages of stored data, such as user data stored on a LUN 101. Each MD node in the tree may correspond to a MD page including MD for a logical address of the FS logical address space 130. More generally, the tree or other hierarchical structure of various MD pages may include any suitable number of levels, such as more or less than 4 levels. In at least one embodiment the tree of MD pages may be an "N-ary" tree, where "N" indicates that each node in the tree structure may have up to a maximum of N child nodes. For example, in at least one embodiment, the tree of MD pages may specify N=512 whereby each node in the tree structure may have up to a maximum of N child nodes. In at least one embodiment the MD mapping structure 600 of FIG. 6 may be used as the MD mapping structure 108 used to determine the location of the data block or contents for different file system objects, such as files and directories. In at least one embodiment, a file may be used to implement a LUN in the file system having the FS logical address space 130.

Figure 6:
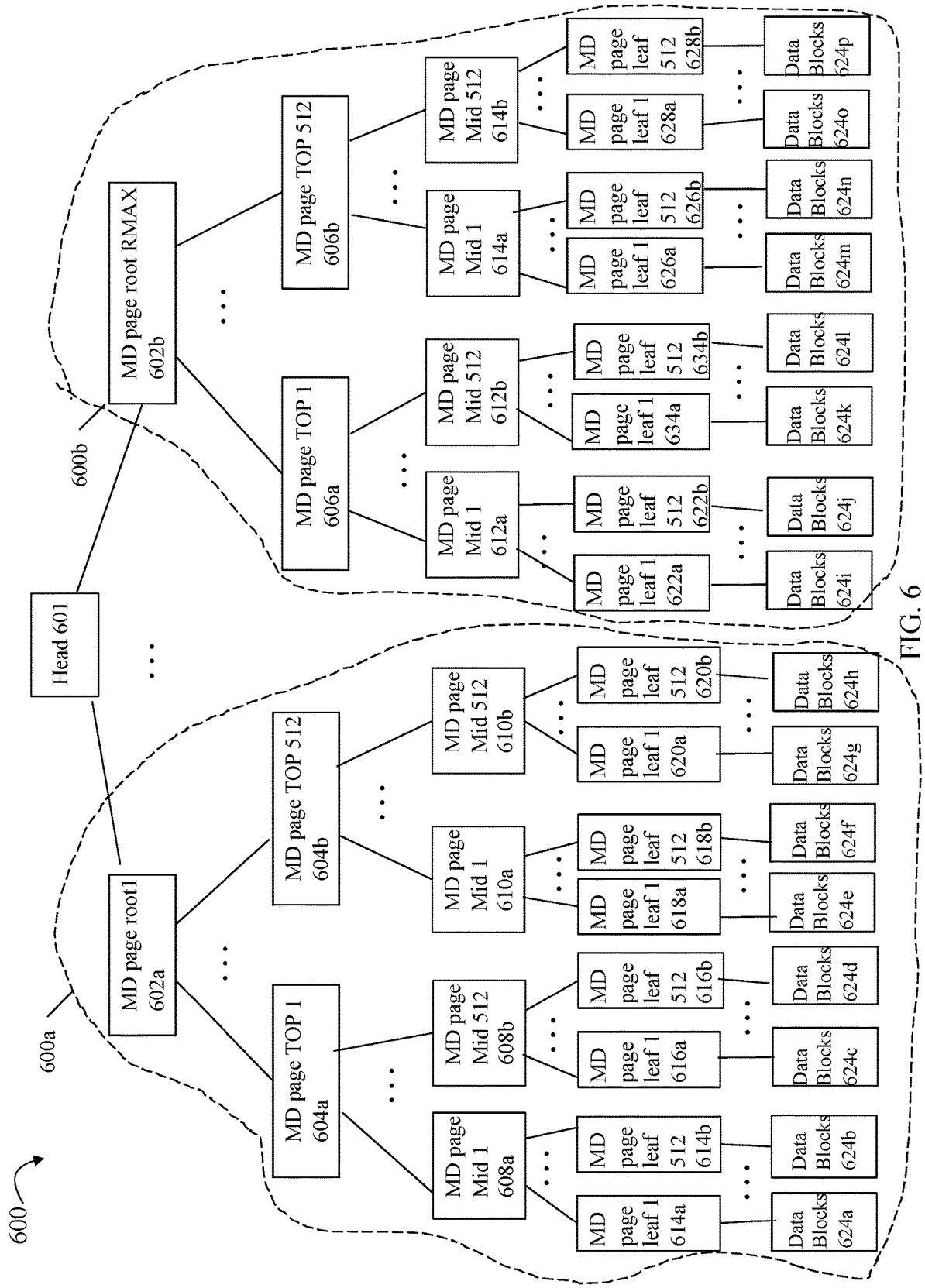
FIGS. 6 and 7 are examples illustrating MD (metadata) structures that may be used to map logical addresses to corresponding storage locations including data stored at the logical addresses in an embodiment in accordance with the techniques herein.

Referring to FIG. 6, shown is an example of a tree of MD pages or nodes that may be used in an embodiment in accordance with the techniques herein. The example 600 includes a tree of MD pages or nodes as noted above with 4 levels—a root level, level 1, including a root MD pages; a top level, level 2, including top MD pages; a mid or middle level, level 3, of mid MD pages; and a bottom level, level 4, of leaf nodes of MD pages. The structure 600 is an example of a MD mapping structure 108 that may be used by the mapping layer 104a to map a logical address of the FS logical address space to a location or data block including the data for the logical address.

In the example 600, there are RMAX root nodes where RMAX is an integer denoting the specified number of root nodes. In at least one embodiment, RMAX may be 32,000 used to map the FS logical address space 130 that is 8 exabytes. The structure head 601 may include pointers to all RMAX MD root nodes. The root level, level 1, includes MD pages 602a-602b denoting the RMAX root nodes. Each root node, such as 602a, has its own subtree of nodes at lower levels. For simplicity of illustration, FIG. 6 shows the subtree of nodes 600a for the first MD page root1 602a and the subtree of nodes 600b for the last MD page root RMAX 602b. Generally, 600a and 600b may also each be characterized as a tree for a single MD page root node. In at least one embodiment, each MD page root, MD page top, MD page mid and MD page leaf may have 512 child nodes.

As also illustrated in the example 600, each of the leaf MD pages in level 4 of the entire tree structure points to, or references (e.g., directly or otherwise indirectly using one more additional levels of indirection of pointers not illustrated), data blocks (e.g., pages of data stored on the LUN 101). For example, MD leaf page 614a points or references, respectively, data blocks 624a. In at least one embodiment, each MD leaf may be mapped to 512 data blocks using an intervening layer referred to as a virtualization layer of blocks (VLBs). Each of the 512 pointers in a single MD leaf may point to a different VLB that further points to a data block. The intervening VLBs may be used, for example, to relocate the underlying data blocks, facilitate data reduction techniques where two MD leaf nodes may indirectly (through the same VLB) point to the same data block, and the like. Elements 624a-624p may each denote a set or group of data blocks. In such an embodiment in which each MD leaf points to 512 data blocks, where each data block is 4 KB and each MD block of the different layers or levels of 600 includes 512 child nodes, then each MD root node describes 256 TB of logical space, each MD top node describes 512 GB of logical space, each MD mid node describes 1 GB of logical space and each MD leaf node describes 2 MB of logical space The links or connections between a parent node (at level M) and its one or more child nodes (at level M+1) in the tree 600 generally represent mappings between the parent node and the one or more child nodes. In at least one embodiment, the parent node may include a reference used to access (directly or indirectly) each of its one or more child nodes. For example, the MD page root1 602a includes addresses or pointers used to access each of its 512 child nodes 604a-b. The mid-level node MD page mid1 608a may include addresses or pointers used to access each of its 512 child leaf nodes 614a-b.

In at least one embodiment, each of the addresses or pointers included in a MD page may reference another MD page or reference a data block, where each such address or pointer may reference a physical storage location on the back-end PDs. Consistent with discussion elsewhere herein, a page table may be used to map each such on-disk address or pointer included in a MD page to a corresponding cache location or address, if the particular MD page is currently stored in cache. Thus, the traversal between connected nodes of the structure 300 may correspond to traversing physical address or storage locations included in pages or nodes that are parent nodes.

In connection with accessing a particular data block in at least one embodiment, all MD pages in a path from the root of the tree to the data block may be required to be traversed in a consecutive serialized order in which such pages appear in the path traversal down the path from the root level to the data block accessed using a particular one of the MD page leaf nodes. For example, assume data block X is included in the set of one or more data blocks 624a. In order to access data block X of 624a, the following denotes the consecutive serialized order in which the MD pages forming a sequence are accessed: MD page root1 602a, MD page top 604a, MD page mid1 608a, and MD page leaf1 614a. Generally, in at least one embodiment, each of the MD pages may include pointers or addresses to locations of one or more child pages or nodes. Thus, the foregoing traversal of MD pages denotes the sequence of MD pages that are processed in consecutive serialized order in order to access the particular data block, such as data block X. In order to access the data block X as stored on PDs where data block X includes first data needed to service an I/O operation, such as a read miss, in connection with a cache miss of the first data, each of the MD pages in the foregoing sequence (e.g., MD page root 602a, MD page top 604a, MD page mid1 608a, and MD page leaf 614a) needs to be accessed in consecutive serialized order. In at least one embodiment, the sequence of MD pages, and more generally, the path from the MD root 602a to the data block X, forms a linked list of nodes or pages of the structure 600. In at least one embodiment, each parent node or MD page of the structure 600 may generally include multiple pointers or references to its child nodes or pages. For example, MD page top 604a includes pointers to its 512 child nodes, MD pages 608a-608b.

As noted elsewhere herein, the data blocks, such as 624a-h and 624i-p, may include data stored on particular logical addresses of a LUN's address space, such as the LUN A's logical address space. In at least one embodiment each MD leaf may include MD for a specified number of LBAs of a LUN. For example, in one embodiment each MD leaf may include MD for 512 LBAs, or more generally, 512 data blocks. For example, with reference to FIG. 6 and as noted elsewhere herein, the data blocks 624a-h may each include data stored on particular logical addresses of a LUN. It may be, for example, that element 624a includes user data stored at a first set of data blocks for LBAs 0-511 for LUN 101. Generally, the particular LBAs of the LUN mapped to each MD page may vary with embodiment. For example, in at least one embodiment, consecutive sequential subranges of the LUN's logical address space, and also the FS logical address space, may be mapped to the MD page leaves. Additionally, when the tree is traversed in a depth first manner, the MD page leaves traversed in the depth first search may correspond to consecutive sequential subranges of the LUN's logical address space.

As generally known in the art, a depth-first search (DFS) is an algorithm for traversing or searching tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the structure 600 of MD pages in a depth-first manner based on a DFS explores all paths, in sequential order, from the left-most path to the right most path as arranged in the tree. In at least one embodiment, when the overall tree including all MD page root nodes of 600 and their descendant nodes is traversed in this depth first manner, the MD page leaf nodes that occur in the DFS traversal correspond to consecutive sequential LBA subranges of LUNs, or more generally, consecutive sequential LBA subranges of the FS logical address space 130.

In at least one embodiment as described herein, each of the MD pages and data blocks in the example 600 may be of a predetermined size and each of the MD pages may hold a known number of entries containing pointer or address values. In such a case and in combination with the correspondence of sequential consecutive LBA ranges of each MD leaf page, an embodiment may perform a calculation to determine the MD page at a particular level that is accessed in the tree MD mapping structure 600 to determine the data block for a particular LUN and LBA, or more generally, for any logical address of the FS logical address space. Similarly, it is a straightforward mathematical calculation to determine the index, offset or entry in a particular page or node to be accessed in connection with obtaining data blocks stored at the particular LUN and LBA. Each MD page in 600a may be known to include MD relevant for accessing data on a particular LUN and one or more LBAs of that LUN. For example, consistent with discussion above, element 624a denotes the data blocks for LBAs 0-511 of LUN 101. In order to access the data block for an LBA of the LUN 101 in the LBA subrange 0-511, MD pages 602a, 604a, 608a and 614a may be traversed in sequential order. In particular, the first entry or offset of the MD page root 1602a may contain the address of the MD page top 1 604a; the first entry or offset of the MD page top1 604a may contain the address of the MD page mid 1 608a; the first entry or offset of the MD page mid 1 608a may contain the address of the MD page leaf 1 614a; and the first entry or offset of the MD page leaf 1 614a may contain the address of the data blocks 624.

In a similar manner, a mapping may be made regarding what MD pages of the structure 600 and entries thereof are used in connection with obtaining data blocks containing data for any particular LUN and LBA, or more generally, any FS logical address. In at least one embodiment, the particular MD pages used to access a data block including data for a particular LUN and LBA may be known based on such mappings and correspondence of LBA subranges to particular MD leaf pages.

In at least one embodiment, each MD page or node in the structure 600 is associated with a consecutive subrange of logical addresses of the FS logical address space. The MD nodes at the highest level, root nodes 602a-b, map to equally sized consecutive subranges of the FS logical address space 130. Generally, the FS logical address space 130 may be partitioned into RMAX consecutive subranges each mapped to a different one of the RMAX MD page root nodes 602a-n. When the structure 600 is traversed in a depth first manner, the descendants of each MD root node will be traversed before proceeding to the next MD root node. The MD root nodes may be considered child nodes of the head structure of pointers 601 where each MD root node is traversed in a depth first manner so that MD root nodes are traversed from left to right order as in the structure 600. Collectively, all the MD nodes at each level are associated with and used in mapping the entire FS logical address space 130

Generally, each child MD node is associated with a consecutive subrange of logical addresses of its parent MD node. In particular the logical address subrange of the parent MD node is partitioned into N equal number of consecutive logical address subranges where N denotes the number of child nodes. When the N child nodes are traversed in a particular order accordance with a depth first traversal of the structure 600, the N logical address subranges may be appended or concatenated in the particular order in which the N child nodes are visited to collectively form a larger logical address range of consecutive contiguous logical addresses.

Figure 7:
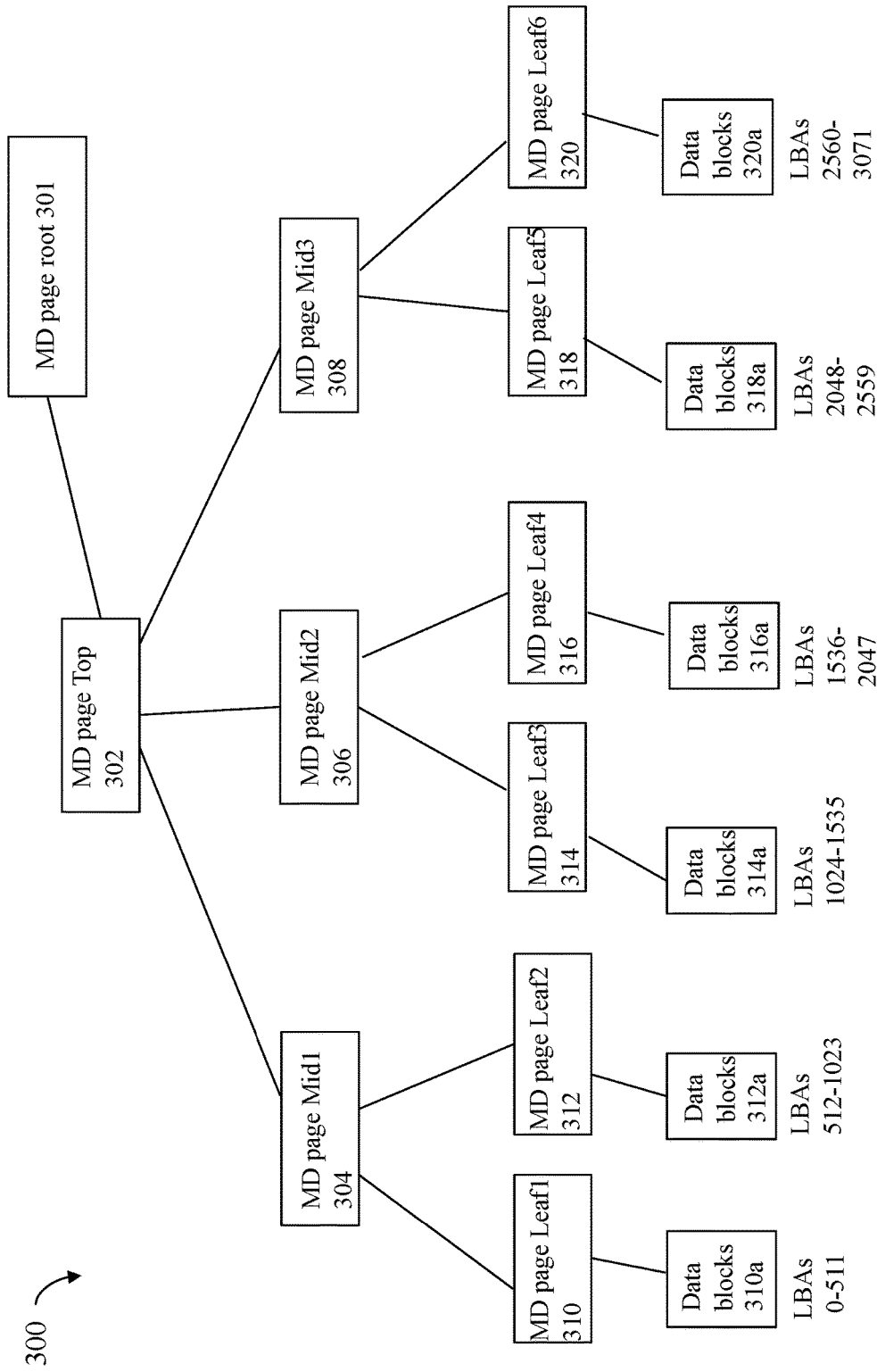

Consider a simple example with reference to FIG. 7 which includes a reduced number of nodes of the different layers or levels of the structure of FIG. 6 for purposes of illustration. In the example 300, assume that the MD page top 302 is referenced by a MD page root node 301 that is associated with C1, a contiguous logical address subrange of the FS logical address space 130. Assume that a LUN B has an inode structure with fields or entries as described in connection with the inode structure 106 of FIG. 3 where the object extent location, and the entire logical address space range for LUN B, is within the FS logical address subrange C1. In fact, let C1 denote the entire logical address subrange of LUN B as mapped into the FS logical address space 130 where LUN B has a capacity of 3072 data blocks. Thus, the object extent location for the inode structure for LUN B may point to the starting address of C1. C1 spans 3072 contiguous and sequential logical blocks in the FS logical address space 130. Assume that C1 is associated with MD page top 302 where determining data blocks for any logical address in C1 uses MD page top 302. Thus, the LUN B has the capacity of 3072 blocks mapped to the logical address subrange C1 associated with MD page top 302. When accessing a data block for any logical address in C1, and thus for the LUN B, the appropriate entry of MD page root node 602a is accessed that points to MD page top 302.

The example 300 includes MDs page of the structure 600 as noted above with 4 levels. In the example 300, the root level 1 includes MD page 301; the top level, level 2, includes MD page 302; the mid level, level 3, includes MD pages 304, 306 and 308; and the bottom level, level 4, includes MD pages 310, 312, 314, 316, 318 and 320, which may also be referred to as leaf nodes. As also illustrated in the example 300, each of the leaf MD pages in level 4 of the tree points to, or references (e.g., directly or otherwise indirectly using one more additional levels of indirection of pointers not illustrated) data blocks (e.g., pages of data stored on the LUN B). For example, MD pages 310, 312, 314, 316, 318 and 320 point or reference, respectively, data block groups 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node may include a reference used to access (directly or indirectly) each of its one or more child nodes.

For example, the top node MD page top 302 may include addresses or pointers used to access each of its child nodes 304, 306 and 308. The mid-level node MD page mid1 304 may include addresses or pointers used to access each of its child leaf nodes 310, 312. The mid-level node MD page mid1 306 may include addresses or pointers used to access each of its child leaf nodes 314, 316. The mid-level node MD page mid1 308 may include addresses or pointers used to access each of its child leaf nodes 318, 320.

In at least one embodiment, each of the addresses or pointers included in a MD page that references a location in another MD page or references a location of a data block may be a physical storage location on the back-end PDs. Consistent with discussion elsewhere herein, a page table may be used to map each such on-disk address or pointer included in a MD page to a corresponding cache location or address, if the particular MD page is currently stored in cache. Thus, the traversal between connected nodes of the structure 300 may correspond to traversing physical address or storage locations included in pages or nodes that are parent nodes.

In connection with accessing a particular data block in at least one embodiment, all MD pages in a path from the root or top level of the tree to the data block may be required to be traversed in a consecutive serialized order in which such pages appear in the path traversal down from the top or root level to the data block accessed using a particular one of the MD page leaf nodes. For example, assume a data block in 312a is to be accessed. In order to access the data block in 312a, the following denotes the consecutive serialized order in which the MD pages forming a sequence are accessed: MD page top 302, MD page mid1 304, and MD page leaf2 312. Generally, in at least one embodiment, each of the MD pages may include pointers or addresses to locations in one or more child pages or nodes. Thus, the foregoing traversal of MD pages denotes the sequence of MD pages that are processed in consecutive serialized order in order to access the particular data block. In order to access a data block, such as data block K, of 312a as stored on PDs where data block K of 312a includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the data block K, forms a linked list of nodes of pages. In at least one embodiment, each parent node or MD page of the structure 300 may generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

As noted elsewhere herein, the groups of data blocks 310a, 312a, 314a, 316a, 318a and 320a include data stored on particular logical addresses of a LUN's address space, such as the LUN B's logical address space. In at least one embodiment each MD leaf may hold MD for a specified number of LBAs of a LUN. For example, in one embodiment each MD leaf may hold MD for 512 LBAs. For example, with reference to FIG. 7 and as noted elsewhere herein, the groups of data blocks 310a, 312a, 314a, 316a, 318a and 320a may each include user data stored on particular logical addresses of the LUN B's logical address space. It may be, for example, that element 310a includes data stored at a first set of LBAs 0-511; and that element 312a includes data stored at a second set of LBAs 512-1023. Generally, the particular LBAs of the LUN mapped to each MD page may vary with embodiment. For example, in at least one embodiment, consecutive sequential subranges of the LUN's logical address space may be mapped to the MD page leaves. Additionally, when the tree is traversed in a depth first manner, the MD page leaves may correspond to consecutive sequential subranges. For example, as denoted in FIG. 7, element 310a denotes data blocks for LBAs 0-511; element 312a denotes data blocks for the LBAs 512-1023; element 314a denotes data blocks for LBAs 1024-1535; element 316a denotes data blocks for LBAs 1536-2047; element 318a denotes data blocks for LBAs 2048-2559; and element 320a denotes data blocks for LBAs 2560-3071.

Each parent node is associated with, and used in determining data blocks, for the consecutive LBA subranges of its child nodes. For example, in FIG. 7 with reference the LUN B noted above, MD leaf 310 includes pointers to the data blocks 312a for LBAs 0-511 of LUN B; MD leaf 312 includes pointers to the data blocks 312a for the LBAs 512-1023 of LUN B; MD leaf 314 includes pointers to the data blocks 314a for LBAs 1024-1535 of LUN B; MD leaf 316 includes pointers to the data blocks 316a for LBAs 1536-2047 of LUN B; MD leaf 318 includes pointers to the data blocks 318a for LBAs 2048-2559 of LUN B; and MD leaf 320 includes pointers to the data blocks 318a for LBAs 2560-3071 of LUN B.

Continuing with the above example with respect to LUN B, MD page 304 includes 2 pointers to its child MD nodes 310 and 312, where MD page 304 is traversed when mapping LBAs 0-1023 of LUN B. MD page 306 includes 2 pointers to its child MD nodes 314 and 316, where MD page 304 is traversed when mapping LBAs 1024-2047 of LUN B. MD page 308 includes 2 pointers to its child MD nodes 318 and 320, where MD page 308 is traversed when mapping LBAs 2048-3071 of LUN B. MD page 302 includes 3 pointers to its child MD nodes 304, 306 and 308 where MD page 302s traversed when mapping LBAs 0-3071 of LUN B. In this manner, each MD node or page may include a table or list of entries of pointers to its children and, based on the logical address for which content is to be obtained, the particular entry of each MD node or page may be accessed where the entry points to the on-disk location of the next MD page in the path or points to the data block to be accessed. For example, the data block containing the data for LBA 1026 may be located by traversing MD page top 302, MD page Mid2 306, and MD page leaf3 314.

Depth first traversal of the nodes in the example 300 are as follows: 301, 302, 304, 310, 310a, 310b, 312, 312a, 312b, 306, 314, 314a, 316, 316a, 308, 318, 318a, 320, and 320a. When performing such a depth first traversal, the sequential order in which the MD leaf nodes are accessed forms a contiguous range of logical block addresses (e.g., the subranges of consecutive logical blocks for MD leaf nodes 310, 312, 314, 316, 318 and 320 are appended or concatenated in order of access in the depth first traversal to form the contiguous range of logical addresses 0-3072 for the LBAs of LUN B.

It should be noted that although the example 7 illustrates a single MD page top node mapping to LBAs of a single LUN, generally, the LBA range of a single LUN may map to any suitable number of MD pages. For example, multiple LUNs may have their LBAs mapped into the FS logical address subrange associated with a single MD top node. In such an embodiment, each LUN may have an associated LBA range and thus capacity that is at least the size of the LBA range associated with a single MD mid node. In at least one embodiment, a single LUN may have its LBAs of the LUN logical address range span multiple MD page top nodes.

Consistent with discussion above and with reference back to FIG. 3, the inode for a file system object in a file system describes where the MD used to obtain the data or contents of the file is located (e.g., such as its on-disk location). For example, the inode 106 for the file 102 includes the object extent location A1 that points to a location or logical address in the FS logical address space 130. The LUN 101 (implemented as the file 102) may have its LUN logical addresses mapped into a subrange 220 of consecutive logical addresses in the FS logical address space. Each logical address of subrange 220, or more generally in the FS logical address space 130, may be mapped by the mapping layer 104a to data blocks containing data for that logical address. Thus, logical addresses of 220 corresponding to offsets or locations in the file 102 (and thus the LUN 101) may be mapped by the mapping layer 104a to data blocks containing data for the file 102. In at least one embodiment, the mapping layer 104a may include and utilize the MD mapping structure 108. In at least one embodiment, the MD mapping structure 108 may be the MD mapping structure such as described and illustrated in the example 600 of the FIG. 6 and also the example 300 of the FIG. 7. With reference to FIG. 6 and also FIG. 3, a first logical address in the FS logical address space 103 corresponding to a logical address in the file 102 (e.g., subrange 220) may be mapped to a starting MD root node in the MD mapping structure, such as in FIG. 6. Based on the first logical address, a particular offset or location in a MD page at each of the 4 MD layers may be mathematically determined where the particular offset or location includes a pointer to the next MD page to be accessed, or otherwise points to the data block.

In one aspect, the MD mapping structure (e.g., such as illustrated in FIGS. 6 and 7) may be characterized as MD location information describing the location of data associated with a logical address of the FS logical address space. Furthermore, the inode structure for a file of the file system also includes MD, such as the object extent location 106d, identifying a logical address in the FS logical address space 130 used to determine the MD location information describing the location of data for the file. In particular, a logical address in the file is mapped to a second logical address in the FS logical address space. The second logical address is used to determine the MD root node, and offset in the MD root node, used to access the next MD page in the sequence of MD pages in the path from the MD root node to the data block containing the data for the second logical address.

In at least one embodiment, logging may be performed in connection with writing data, or more generally, modifying or storing content on a LUN or other object having its address space mapped into the FS logical address space as discussed above. Logging may be performed to allow transactional based updates where a single transaction may comprise a set of multiple writes or modifications to one or more LUNs or other objects in the FS logical address space. Each of the writes may be logged as a log record of a log file stored on a log device. Thus, for example, a single transaction of 4 writes to a LUN results in 4 log records recorded in the log file. The single transaction may be characterized as committed whereby all 4 writes are recorded as 4 log records in the log file. At a subsequent point in time, the 4 log records as well as other records of the log file are applied to the LUN and written out to the backend PDs having storage provisioned for the LUN. In such a system, all 4 writes of the single transaction are committed, or not, to the log file as an atomic unit. Once the single transaction has been committed by journaling or recording the log records in the log file, a response regarding completion of the transaction may be sent to the application, or more generally client, that initiated the transaction. The foregoing allows an embodiment to more promptly return an acknowledge or response regarding completion of the write I/Os and thus transaction comprising multiple writes I/Os. Subsequently, the data storage system may proceed with flushing the log file to store the write data, logged in the log records of the log file, on the backend PDs providing the provisioned physical storage for the LUNs (or more generally file system storage objects).

Figure 8:
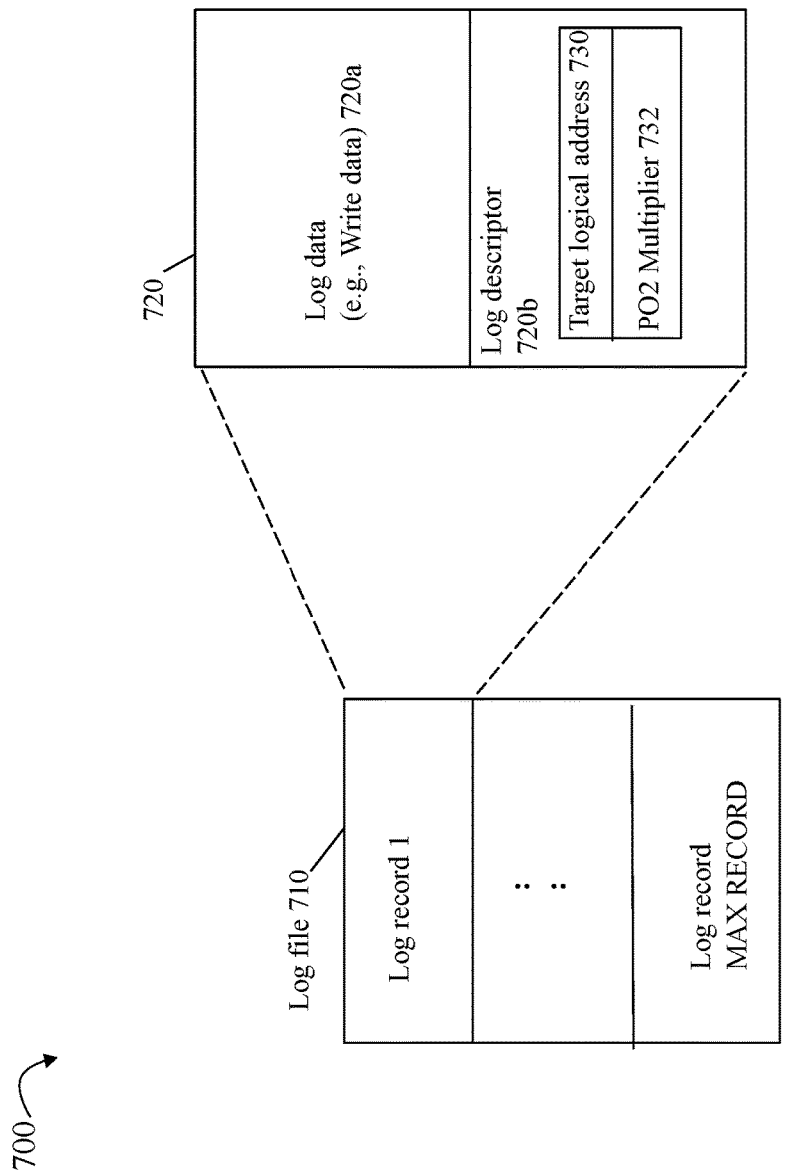
FIG. 8 is an example illustrating a log file of log records that may be used in an embodiment in accordance with the techniques herein.

Referring to FIG. 8, shown is an example of a log file that may be stored on a log device in an embodiment in connection with the techniques herein The example 700 includes log file 710 with multiple log records 1 through MAXRECORD (denoting the last record of the log file). Element 720 illustrates in more detail information that may be stored in log record 1. However, more generally, the information denoted by element 720 may be stored in each log record of the log file 710. Element 720 includes log data 720a and log descriptor 720b. The log data 720a may be the write data written to a target location. The target location may be expressed in a write I/O operation as a LUN and LBA or offset in the LUN's logical address space. Consistent with other discussion herein, the LUN has a starting or base address in the FS logical address space at which the LUN's logical address space begins. Thus, one piece of information that may stored in the log descriptor 720b is used to identify the target location of the write. The log descriptor 720b may also generally include other information used in connection with the logged write operation.

In at least one embodiment, the log file 710 may be stored in non-volatile memory or storage (e.g., NVRAM), also referred to herein as a log device. Generally, the log device may be a form of expensive but fast non-volatile memory that is a fixed size resource. It may be desirable to have the log records of the log file 710 as small as possible in order to maximize the number of log records capable of being stored on the log device. Additionally, smaller log records result in more log records being combinable into a single write out to the log device. Thus, latency with respect to logging writes to the log device may be reduced. In at least one embodiment, each log record of the log file 710 may be the same fixed size. In such an embodiment, the log data 720a of each log record of the log file may be the same size and also the log descriptor 720b of each log record may also be the same size.

Consistent with discussion above, the LUN may be mapped into the FS logical address space where the LUN has a starting or base address in the FS logical address space. In one existing system without the techniques herein where the FS logical address space is 8 exabytes, the log descriptor 720b may include the base or starting logical address of the LUN in the FS logical address space. In such an embodiment without using the techniques herein, the log descriptor 720b may also include the target logical address of the LBA (of the target location) when the LBA is mapped into the FS logical address space. In other words, the target logical address of the LBA is the sum of the LBA and the base or starting logical address of the LUN in the FS logical address space. In such an existing system without using the techniques herein where the FS logical address space is 8 exabytes, the log descriptor 720b may include the target logical address of the target location LBA (as mapped into the FS logical address space) as an 8 byte field and may also include the base or starting logical address of the LUN as another 8 byte field.

Described in following paragraphs are techniques that may be used to reduce the size of each log record stored in the log file 710. In particular, such techniques may be used to store a reduced size log descriptor 720b for each log record of the log file 710. In at least one embodiment in accordance with the techniques as illustrated in FIG. 8, the log descriptor 720b may include a target logical address 730 and a PO2 (power of 2) multiplier 732. The target logical address 730 may be characterized as the logical address in the FS logical address space of the target location, as noted above. Put another way, the target location (e.g., LUN, LBA) as may be specified in a received I/O operation is mapped to the target logical address in the FS logical address space, where the target logical address in the FS logical address space is stored as element 730 in the log descriptor 720b. Thus, the target logical address 730 just described is the sum of the LBA (e.g., relative offset in the LUN) and the starting or base logical address of the LUN in the FS logical address space. For an object, such as LUN, having an associated size that is a PO2, where $2^j$=the size of the LUN (or more generally, extent or object), the PO2 multiplier 732 may denote the exponent, "j". With respect to at least one embodiment in accordance with the techniques herein where the object is a LUN, the PO2 multiplier 732 may denote the exponent, "j", where $2^j$ is the capacity or size of the LUN corresponding to the size of the LUN's logical address space (where the LUN's logical address space is then further mapped into the larger FS logical address space). More generally in connection with another type of object or extent having an associated size, the PO2 multiplier 732 may denote the exponent, "j", where $2^j$ is the size of the object or extent having an associated logical address space or range that is mapped into the larger FS logical address space. The PO2 multiplier 732 for an extent size may also be expressed as:

$$\text{PO2 multiplier(extent size)} = \log \text{ base } 2(\text{extent size}) \quad \text{EQUATION 1}$$

where log base 2 denotes the binary logarithm or base 2 logarithm of the extent size.

For example, for an extent size=64, the log base 2, and thus the PO2 multiplier, is 6.

In at least one embodiment having an 8 exabyte FS logical address space, the target logical address 730 and the PO2 multiplier 732 may be stored in the log descriptor 720b where the target logical address 730 may be, for example, an 8 byte field, and the PO2 multiplier 732 may be, for example, a single byte. Additionally, not all 8 bits of the single byte PO2 multiplier 732 may be consumed. For example, in at least one embodiment as described herein, the PO2 multiplier 732 may use only 6 bits, and with further optional optimizations described below, may use only 5 bits. In at least one embodiment in accordance with the techniques herein, the fields 730 and 732 may be used, for example, rather than the 2, 8 byte fields (totaling 16 bytes) described above storing the LBA and the base or starting logical address of the LUN as another 8 byte field. Thus, in at least one embodiment in accordance with the techniques herein, each log record of the log file 710 may be reduced by 7 bytes. In such an embodiment in accordance with the techniques herein, the single byte PO2 multiplier 732 may be stored in each log record as opposed to storing, for example, an 8 byte field containing the base or starting logical address of the LUN or object in the file system.

The foregoing and other aspects of the techniques herein are described in more detail in following paragraphs.

In an embodiment in accordance with the techniques herein, an overall logical address space, such as the FS logical address space described elsewhere herein (e.g., element 130 as in connection with FIGS. 2, 3 and 5) may be generally managed in power of 2 (PO2) sizes. For example, PO2 sizes are 1 (e.g., $2^0$), 2 (e.g., $2^1$), 4 (e.g., $2^2$), 8 (e.g., $2^3$), 16 (e.g., $2^4$), and the like.

An object, such as a LUN or directory, may be referred to herein as having an extent or allocation size that is a PO2. The extent allocated for an object, such as a LUN, may be at least a specified minimum extent size, where the minimum extent size allowable is also a PO2. When allocating an extent of storage (and thus a portion of the FS logical address space) for an object such as for LUN, the allocated extent has a starting or base logical address in the FS logical address space that is aligned on a boundary that is an integer multiple of the extent size. For example, assume the minimum extent size is 512 GB. A first extent may be allocated for a LUN having a storage capacity of 1 TB (terabyte=1024 GBs). The first extent may be located in the FS logical address space to have a starting or base logical address that is a multiple of 1 TB (e.g., the first extent may be located at logical addresses 2 TB-3 TB or 3 TB-4 TB in the FS logical address space). As another example, a second extent may be allocated for another LUN having a 4 TB storage capacity. The second extent may be located in the FS logical address space to have a starting or base logical address that is a multiple of 4 TB (e.g., the second extent may be located at logical addresses 4 TB-7 TB or 8 TB-11 TB in the FS logical address space).

The minimum extent or allocation size, such as for an object that is a LUN or directory, may be any suitable size that is a PO2. The minimum extent or allocation size may be selected using any suitable technique. For example, in at least one embodiment, the minimum extent size may be 512 GB, which is the amount of storage and subrange of the FS logical address space 130 mapped by a MD top page or node, such as described above in connection with FIGS. 6 and 7.

In at least one embodiment, the capacity or size requested for allocation may be required to be at least the minimum extent size and may be required to be a PO2. If a capacity or size requested does not meet such requirements, then the actual extent size allocated may be sized up or increased to meet such requirements. For example, assume that a LUN is created with a capacity of 513 GB in a system with a minimum of 512 GBs. In such case, an embodiment may actually allocate an extent size of 1024 GB for the LUN despite the 513 GB capacity due to the requirement that the allocated extent size be a PO2. Additionally, as noted above, the system may map the 1024 GB extent allocated to a starting or base logical address in the FS logical address space, where the starting or base logical address is on a 1024 GB boundary (e.g., integer multiple of 1024 GB). Thus, subranges or portions of the FS logical address space 130 may be allocated in accordance with such requirements where the size of the extent allocated (and the size of its subrange in the FS logical address space) is a PO2, is at least the specified minimum size that is a PO2, and has a base or starting logical address in the FS logical address space that is an integer multiple of the extent size (e.g., extent is aligned on a boundary that is a multiple of its size). Thus, the PO2 multiplier for an extent denotes both the size of the extent and also the alignment of the extent within the FS logical address space.

In at least one embodiment as described herein, the PO2 multiplier may be 6 bits in size to store the PO2 exponent of the largest possible logical address, $2^{63}$, in the FS logical address space that is 8 exabytes in size. More generally, the number of bits, as well as other details described herein, may vary with the actual size of the FS logical address space of an embodiment.

Figure 9:
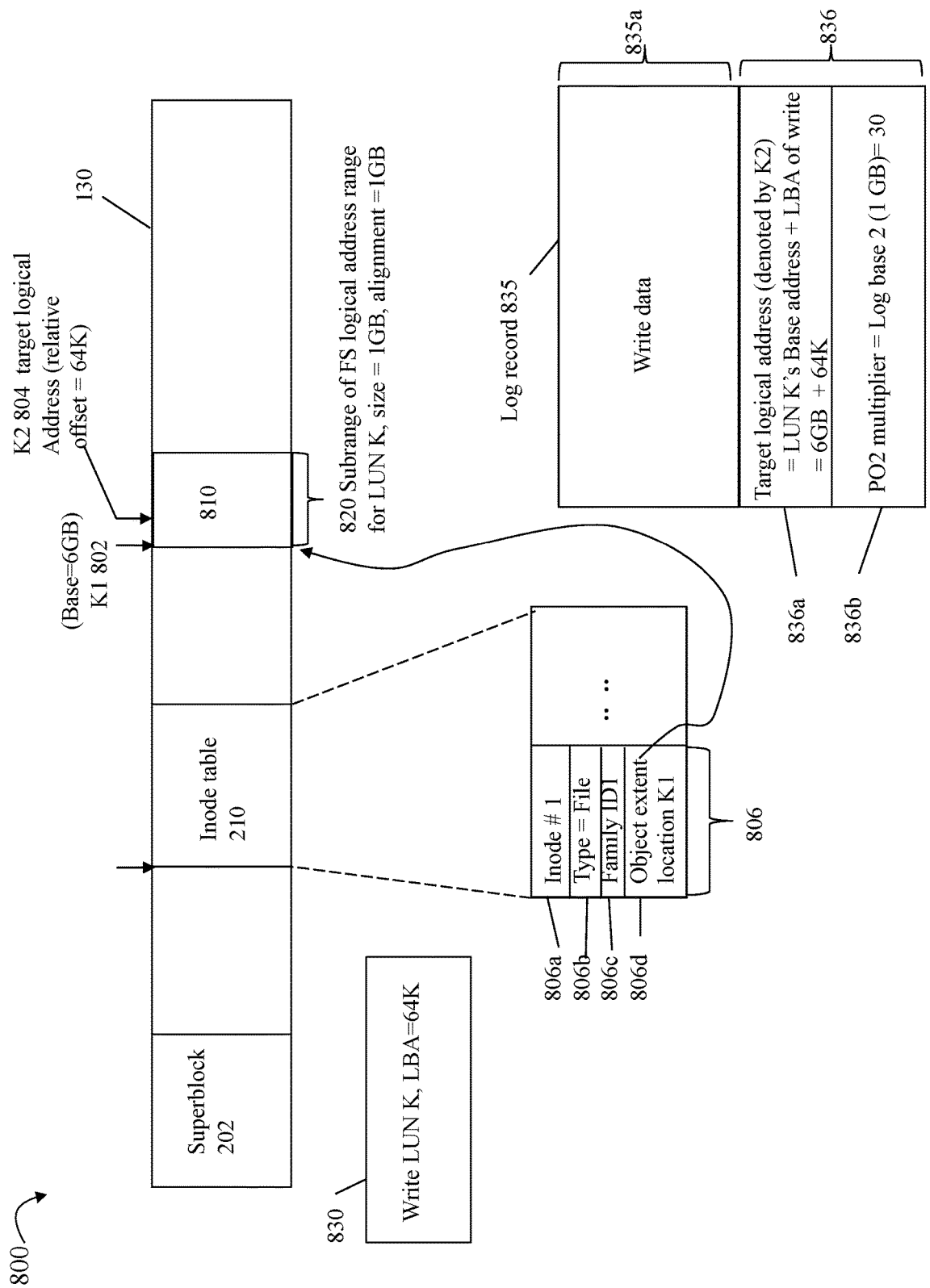

Referring to FIG. 9, shown is an example 800 illustrating use of the techniques herein in at least one embodiment. The example 800 includes the FS logical address space 130 with superblock 202, inode table 210 and other information as discussed above where some details have been omitted for simplicity of illustration. In this example, assume that the minimum extent size is 512 GB and that a LUN K is implemented as a file in a manner similar to that as described above for the LUN 101 (e.g., of FIGS. 2 and 3) with the difference that the example 800 illustrates an extent 810 allocation, inode information 806 in the inode table 210, and the like, for the LUN K (rather than the LUN 101). In the example 800, LUN K has a corresponding entry 806 in the inode table 210. The entry 806 indicates that LUN K, implemented as a file object in the FS having the FS logical address space 130, has an inode #=1 (806a), is an object type of file (806b), has a family ID of ID1 (806c) and has an extent location (806d) or base address of K1. K1 is denoted by element 802 in the FS logical address space 130 where the LUN K has a size (and thus extent size) of 1 GB (that is a PO2 and greater than the minimum extent size of 512 GB), where the extent for LUN K has a base or starting logical address K1=6 GB, and where the extent is aligned on a 1 GB boundary. Thus, the extent for LUN K meets all PO2 requirements as noted above.

In this example 800, assume a write I/O 830 is received that writes data for LUN K, at LBA 64K within LUN K's logical address space.

In accordance with the techniques herein and consistent with discussion of the log record of FIG. 8, a log record 835 may be created in the log file for this write 830. The log record 835 includes log data 835a storing the write data written by the write I/O operation 830. The log record 835 also includes a log descriptor 836 which further includes the target logical address denoted by 836a and a PO2 multiplier denoted by 836b. In connection with the write 830, the target logical address 836a is determined which generally maps the target location of LUN K, LBA=64K (relative to the LUN K's logical address space), into the FS logical address space 130. In this case, the target logical address is computed as the sum of LUN K's base address (e.g., 6 GB) and the LBA (64K) of the write 830. The PO2 multiple 836b is computed as the log base 2 or binary logarithm of the size of the extent for LUN K. In this example, the extent for LUN K is 1 GB (the size or capacity of LUN K) and the corresponding PO2 multiplier 836b is 30 (e.g., $2^{30}$=1 GB).

Element 804 denotes K2, the target logical address for the write 830, which is the sum of the base address K1 and 64 K (the write I/O LBA or relative offset of 64K with respect to the base address K1).

Consistent with discussion above such as illustrated in the FIG. 8, the values of 836a, 836b may be respectively stored in the log descriptor 836 of the log record 835 for the write 830.

It should be noted that generally, the values for the target logical address 836a and PO2 multiplier 836b may be computed using any suitable technique. For example, in at least one embodiment implemented using the C programming language, a library routine or function _builtin_clz included in the GNU C library, may be used to determine L1, the number of leading zeroes in the extent size. In such an embodiment, the PO2 multiplier may be expressed as:

$$\text{PO2 multiplier(extent size)}=63-\_builtin\_clz(\text{extent size}) \qquad \text{EQUATION 2}$$

Wherein extent size is the size of the extent (e.g., such as in bytes); and 63 is an integer value denoting the largest PO2 needed to express the largest logical address in the FS logical address space 130 (e.g., in this case, the FS logical address space 130 may be 8 exabytes or $2^{63}$).

At a later point in time after the log record 835 for the write 830 has been committed to the log file, the log record 835 for the write 830 including 836a, 836b may be processed to store the write data of 835a at the on-disk location on physical storage of the backend PD provisioned for LUN K. Such processing may also be referred to as flushing the log file to flush and process one or more log records of the log file and write the write data of the one or more log records to the actual PDs. At this point in time when flushing and processing the log record 835 for the write 830 to actually write out the new write data 835a to an on-disk location for the LUN K, LBA=64K, the information of 836a, 836b may be used in performing calculations to determine, with respect to the extent for LUN K, the extent size and base or starting logical address of the extent.

Figure 10A:
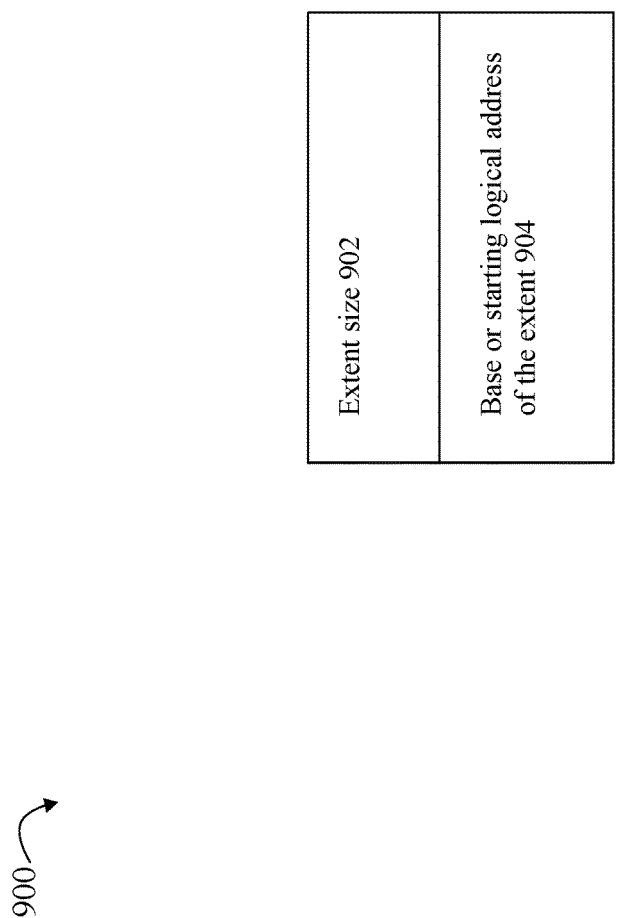
FIG. 10A is an example illustrating values that may be calculated using information from a log descriptor of a log record of the log file in an embodiment in accordance with the techniques herein.

FIG. 10A illustrates the extent size 902 and the base or starting logical address 904 with respect to LUN K that may be calculated using the values 836a, 836b stored in the log record 835 for the write 830.

The extent size 902 may be determined from the PO2 multiplier 836b as expressed in EQUATION 3:

$$\text{Extent size}=2^X \qquad \text{EQUATION 3}$$

where

X is the PO2 multiplier 836b.

The recalculated base or starting logical address of the extent 904 for the LUN K may be determined using the PO2 multiplier 836b and the target logical address 836a as expressed in EQUATION 4:

$$\text{Base or starting logical address(LUN }K\text{'s extent)}=(\sim(2^n-1))\&(\text{target logical address}) \qquad \text{EQUATION 4}$$

where

Base or starting logical address is the base or starting logical address for the extent of LUN K in the FS logical address space;

$2^n$ denotes 2 to the power of n, where n is the PO2 multiplier 836b and thus $2^n$ is the size of the extent (e.g., as may be determined using EQUATION 3);

~ denotes the bitwise complement operator as applied to the quantity $(2^n-1)$ (e.g., bitwise complement is where each bit of the quantity $(2^n-1)$ is flipped whereby each bit position having a 1 becomes 0 in the computed result, and each bit position having a 0 becomes 1 in the computed result);

target logical address is the LBA of the write to the LUN mapped into the FS logical address space whereby the target logical address represents the sum of the base logical address and the LBA (e.g., target logical address 836a from log record); and & denotes the logical bitwise AND operator.

EQUATION 4 may be generalized for use with any extent for any object in the FS logical address space.

As a variation, the recalculated base or starting address of the extent 904 may also be expressed and determined as in EQUATION 5:

$$\text{Base or starting logical address}(LUN\ K's\ \text{extent}) = \left[\text{INT}\left(\frac{\text{target logical address}}{\text{extent size}}\right)\right] * \text{extent size} \quad \text{EQUATION 5}$$

where target logical address is the LBA of the write to the LUN mapped into the FS logical address space whereby target logical address represents the sum of the base logical address and the LBA (e.g., target logical address 836a from log record);

INT denotes the integer floor of the division of target logical address divided by extent size (e.g., if the result is not an integer multiple, then INT denotes the integer quotient. For example, INT (3.41)=3 and INT (3.65)=3); and extent size may be as calculated using EQUATION 3.

Additionally, the calculated base or starting logical address of the extent 904 (e.g., determined using EQUATION 4 or 5) may be further used to determine LBA$_{LUN\ K}$, the LBA or relative offset within the LUN K's logical address range (e.g., LBA of the write 830) as expressed in EQUATION 6:

$$\text{LBA}_{LUN\ K} = \text{target logical address} - \text{base or starting logical address}(LUN\ K) \quad \text{EQUATION 6}$$

Where

LBA$_{LUN\ K}$ denotes the LBA or relative offset (e.g., LBA of the write 830) of the logged write within the LUN K's logical address range (rather than the FS logical address space);

target logical address is the LBA of the write to the LUN mapped into the FS logical address space whereby target logical address represents the sum of the base logical address and the LBA (e.g., target logical address 836a from log record); and base or starting logical address (LUN K) denotes the base or starting address for the extent of LUN K as recalculated, for example, using EQUATION 4 or 5.

Generally, any of the calculated values determined when flushing the log record may be used in any suitable manner. For example, in at least one embodiment one or more of: the extent size (e.g., EQUATION 3), base or starting logical address of the extent (e.g., EQUATIONS 4 and 5) and LBA$_{LUN\ K}$ (e.g. EQUATION 6), may be stored and/or used as additional MD for recovery processing and consistency checking or verification.

Figure 10B:
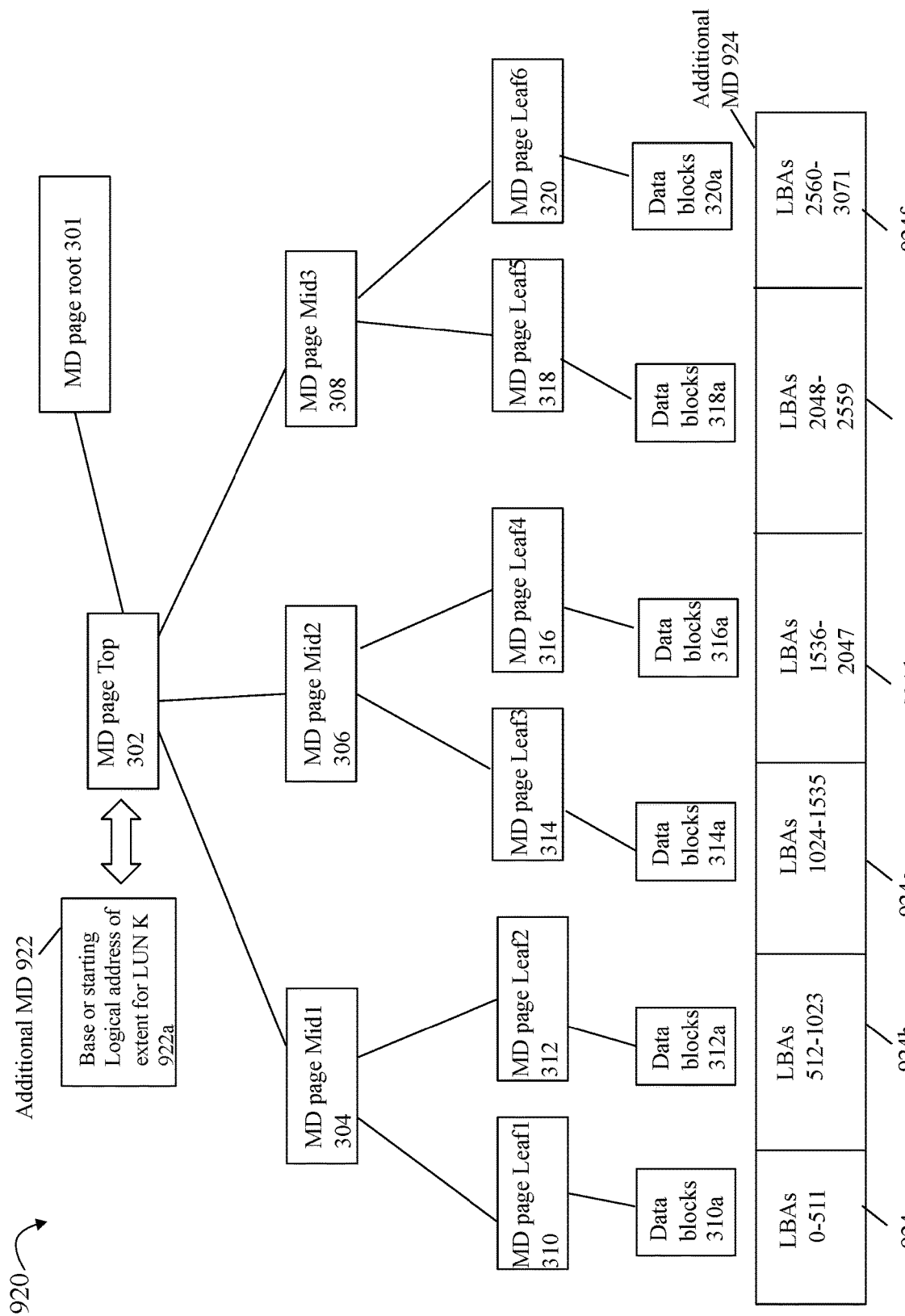
FIG. 10B is an example illustrating additional MD that may be associated with MD nodes of the MD mapping structure in an embodiment in accordance with the techniques herein.

For example, at least one embodiment may store the base or starting logical address of the extent such as for LUN K and/or the extent size for the LUN K as additional MD associated with one or more MD nodes of MD mapping structure (e.g., of FIGS. 6 and 7). The foregoing additional MD may be used, for example, in connection with recovering or restoring a corrupted inode for the LUN K. For example, the inode information 806 of FIG. 9 for LUN K may become corrupted where the content of field 806d is lost or corrupted. Without 806d, the content or data for LUN K may not be recoverable. However, the object extent location K1 806d may be recovered using the base or logical address of the extent (e.g., recalculated using EQUATION 4 or 5 in connection with flushing the log file) that may be stored as a piece of the additional MD associated with one of the MD nodes of the MD mapping structure. For example, with reference to the FIG. 10B in at least one embodiment, shown is a MD mapping structure 920. The example 920 is similar to that as described in connection with FIG. 7 with the difference that additional MD is illustrated. For example, the base or starting logical address of the extent for LUN K 922a may be stored as additional MD 922 associated with the top MD node 302 of the MD mapping structure, where the top MD node 302 and all its descendant MD nodes may denote a subtree of MD nodes used for accessing data blocks and content of LUN K. It should be noted that description above indicates that LUN K has a capacity of 1 GB. However, for simplification of illustration with FIG. 10B, assume that the subtree having MD page top 302 as the root only illustrates a portion of the subtree of nodes for LUN K's entire 1 GB capacity.

As another example, the LBA$_{LUN\ K}$ (e.g. EQUATION 6) may be stored as additional MD associated with one or more of the MD nodes of the MD mapping structure. As discussed elsewhere herein, each of the MD nodes of the MD mapping structure may have associated MD identifying the particular LBAs or relative offsets within the LUN's logical address space mapped by each such MD node. The LBA$_{LUN\ K}$ is one piece of MD that may be associated with one or more of the MD nodes traversed when accessing the content or data block for that particular LBA$_{LUN\ K}$. Thus, the LBA$_{LUN\ K}$ stored as additional MD associated with a MD node may be used, for example, when reconstructing a corrupted MD mapping structure to determine which MD nodes are relevant for accessing what particular data blocks mapped to different LUN LBAs. Additionally, when performing an I/O operation such as the write 830, the LBA$_{LUN\ K}$ computed for the log record of the write 830 may be used as a consistency check when accessing the data block storing the content for the write I/O operation. For example, assume a first MD node is traversed in the path of different MD nodes of the mapping structure to access the data block for write operation 830. In this case, the computed LBA$_{LUN\ K}$ for the log record of the write 830 may be compared to existing LBAs stored as MD associated with the first MD node. Such comparison may be performed as a consistency check whereby the LBA$_{LUN\ K}$ is expected to match one of the existing LBAs stored as MD associated with the first MD node. To further illustrate, reference is again made to FIG. 10B where additional MD 924 may be associated with MD leaf nodes of the MD mapping structure 920. For example, MD portions 924a-f may denote additional MD associated, respectively, with MD leaf nodes 310, 312, 314, 316, 318 and 320. The MD portions 924a-f may identify the particular LBAs of LUN K associated, respectively, with MD leaf nodes 310, 312, 314, 316, 318 and 320. In a similar manner, additional MD associated with MD mid nodes 304, 306 and 308 and/or MD top node 302 may also include relevant LBA ranges of the LUN K associated with the MD nodes.

As described herein, the PO2 multiplier may be reduced to the size of less than a byte. For example, as described above with an 8 exabyte FS logical address space, the PO2 multiplier may have a size of 6 bits to accommodate storing the largest PO2=63 for an 8 exabyte FS logical address space (e.g., where $2^{63}$ is the largest possible logical address in the FS logical address space). An embodiment may further reduce the number of bits used to encode the PO2 multiplier by implicitly assuming the minimum extent size. For example, assume the minimum extent size is 512 GB which can be expressed using "m" bits, where m=39. The "m" bits may be implied or implicitly added and subtracted as needed from the PO2 multiplier to further reduce the number of bits consumed for storing the PO2 multiplier. For example, the PO2 multiplier for the size of the extent may be represented as in EQUATION 1 described elsewhere herein.

Now, assuming the minimum size of any extent is 512 GB, where log base 2 (512 GB)=39, let m=39, then the PO2 multiplier may alternatively calculated as:

$$\text{PO2 multiplier(extent size)} = (\log \text{ base 2(extent size)}) - m \quad \text{EQUATION 7}$$

where m=log base 2 (minimum extent size).

If EQUATION 7 is used rather than EQUATION 1 when computing the PO2 multiplier in an embodiment in accordance with the techniques herein, where m is automatically and implicitly subtracted when determining the PO2 multiplier (as in EQUATION 7), then the equation used to compute the base or starting logical address of an extent must also implicitly add "m" back into the calculation performed as follows:

$$\text{base or starting logical address(LUN } K\text{'s extent)} = (\sim(2^{n+m}-1)) \& (\text{target logical address}) \quad \text{EQUATION 8}$$

where EQUATION 8 may be used, for example, rather than EQUATION 4 noted above.

Additionally, in such an embodiment, rather than use EQUATION 3, the following EQUATION 9 may be used to calculate extent size:

$$\text{Extent size} = 2^{X+m} \quad \text{EQUATION 9}$$

where

X is the PO2 multiplier 836*b*.

As will be appreciated by those skilled in the art, other mathematically equivalent expressions may be obtained and used in performing calculations described herein even though all such possibilities are not explicitly enumerated herein.

In such an embodiment using EQUATIONS 7, 8 and 9 with an 8 exabyte address space and a minimum extent size of 512 GB, the number of bits needed to store the PO2 multiplier may be further reduced to 5 to accommodate the largest possible PO2 multiplier value, which is now 24 rather than 63 (e.g., 63 bits less the 39 bits implied by the 512 GB minimum extent size).

Figure 11A:
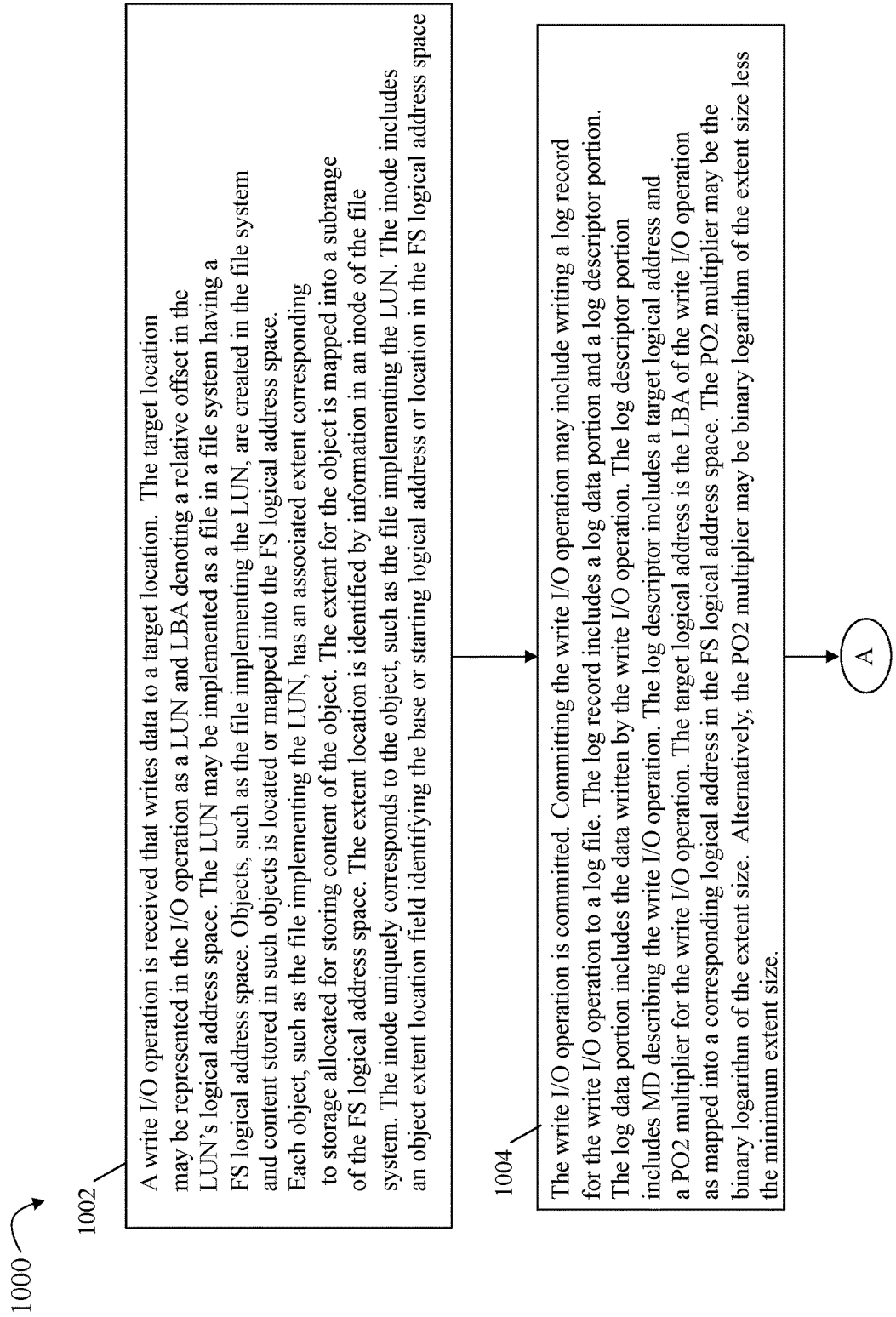
FIGS. 11A and 11B are flowcharts illustrating processing that may be performed in an embodiment in accordance with the techniques herein.
Figure 11B:
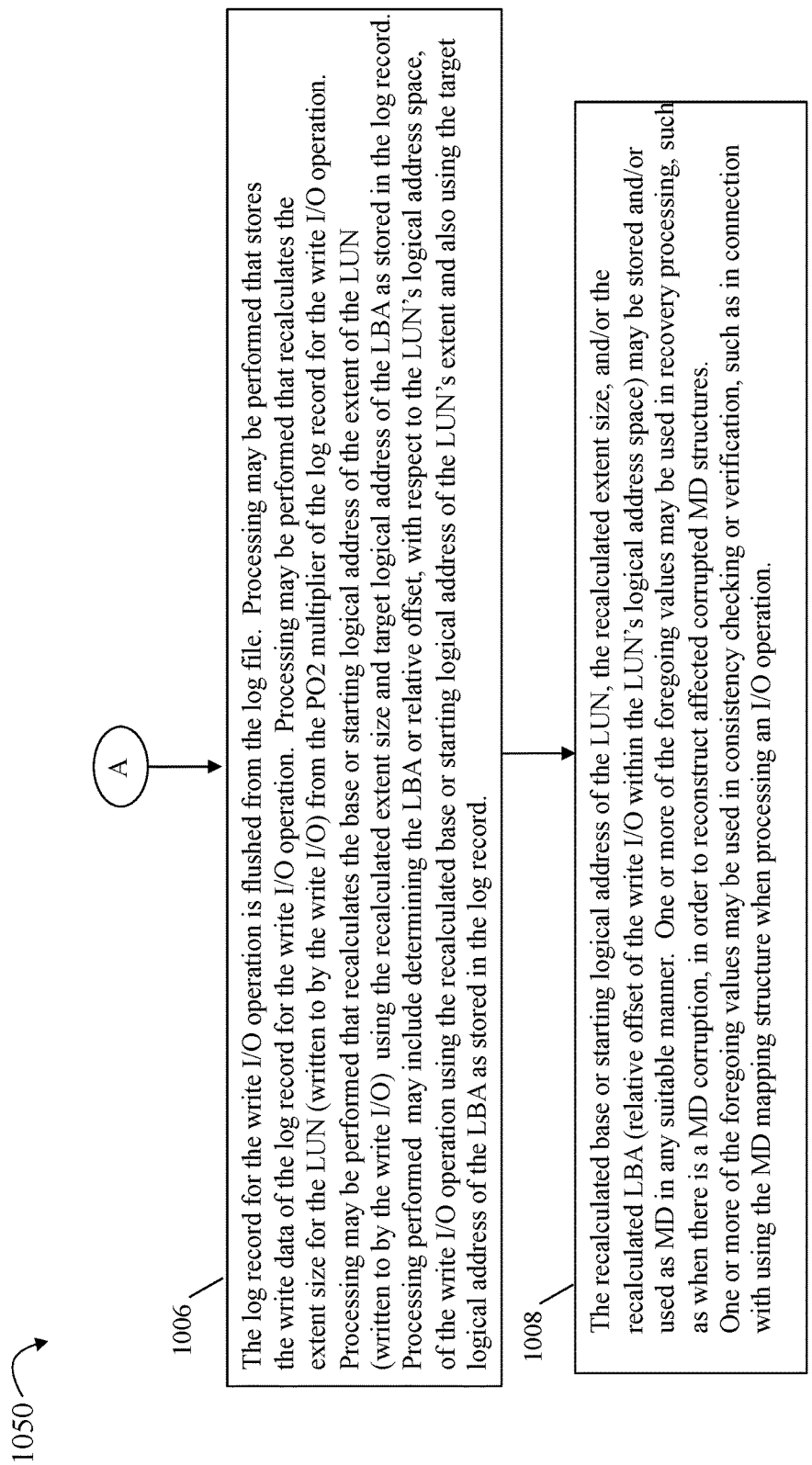

Referring to FIGS. 11A and 11B, shown are processing steps that may be performed in an embodiment in accordance with the techniques herein. The steps of FIGS. 11A and 11B summarize processing described above.

Referring to FIG. 11A, the step 1002 may be performed where a write operation is received that write data to a target location. The target location may be represented in the I/O operation as a LUN and LBA denoting a relative offset in the LUN's logical address space. The LUN may be implemented as a file in a file system having a FS logical address space. Objects, such as the file implementing the LUN, are created in the file system and content stored in such objects is located or mapped into the FS logical address space. Each object, such as the file implementing the LUN, has an associated extent corresponding to storage allocated for storing content of the object. The extent for the object is mapped into a subrange of the FS logical address space. The extent location (e.g., starting or base logical address in the FS logical address space) is identified by information in an inode of the file system. The inode uniquely corresponds to the object, such as the file implementing the LUN. The inode includes an object extent location field identifying the extent location, also referred to herein sometimes as the base or starting logical address or location in the FS logical address space. From the step 1002, processing proceeds to the step 1004.

At the step 1004, the write I/O operation received in the step 1002 is committed. Committing the write I/O operation may include writing a log record for the write I/O operation to a log file. The log record includes a log data portion and a log descriptor portion. The log data portion includes the data written by the write I/O operation. The log descriptor portion includes MD describing the write I/O operation. The log descriptor includes a target logical address and a PO2 multiplier for the write I/O operation. The target logical address is the LBA of the write I/O operation as mapped into a corresponding logical address in the FS logical address space. The PO2 multiplier may be the binary logarithm of the extent size. Alternatively, the PO2 multiplier may be the binary logarithm of the extent size minus the minimum extent size. From the step 1004, processing proceeds to the step 1006.

At the step 1006, The log record for the write I/O operation is flushed from the log file. Processing may be performed in the step 1006 that stores the write data of the log record for the write I/O operation to PDs. Processing may be performed in the step 1006 that recalculates the extent size for the LUN (written to by the write I/O) from the PO2 multiplier of the log record for the write I/O operation. Processing may be performed in the step 1006 that recalculates the base or starting logical address of the extent of the LUN (written to by the write I/O) using the recalculated extent size and target logical address of the LBA as stored in the log record. Processing performed in the step 1006 may include determining the LBA or relative offset, with respect to the LUN's logical address space, of the write I/O operation using the recalculated base or starting logical address of the LUN's extent and also using the target logical address of the LBA as stored in the log record. From the step 1006, processing proceeds to the step 1008.

At the step 1008, the recalculated base or starting logical address of the LUN, the recalculated extent size, and/or the recalculated LBA (e.g., relative offset of the write I/O within the LUN's logical address space) as determined in the step 1006 may be stored and/or used as additional MD in any suitable manner. For example, one or more of the foregoing values (as determined in the step 1006) may be used in recovery processing, such as when there is a MD corruption, in order to reconstruct affected corrupted MD structures. As another example, one or more of the foregoing values may be used in consistency checking or verification, such as in connection with using the MD mapping structure when processing an I/O operation.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   receiving a write I/O operation that writes first data to a target location, wherein the target location is represented as a first logical device and a first offset within a first logical address space of the first logical device;

storing a log record for the write I/O operation in a log file, wherein the log record includes log data and a log descriptor, wherein the log data includes the first data, wherein the log descriptor includes a target logical address for the target location in a file system logical address space, wherein the target logical address is determined by mapping the target location to a corresponding logical address in the file system logical address space, wherein the log descriptor includes a first value denoting the binary logarithm of an extent size of the first logical device; and performing first processing of the log record, wherein said first processing includes flushing the log record from the log file to store the first write data of the log record on a first extent of physical storage provisioned for the first logical device.

2. The method of claim 1, wherein the extent size denotes a size of the first extent of physical storage allocated for storing content of the first logical device, and wherein the first extent is mapped to a subrange of the file system logical address space.

3. The method of claim 2, wherein the first logical device is implemented as a file in a file system having the file system logical address space.

4. The method of claim 3, wherein said first processing further comprises:

determining the extent size of the first logical device using the first value of the log record; and determining, in accordance with the first value and the extent size, a base address in the file system logical address space for the first logical device, wherein the base address denotes a starting logical address in the file system logical address space for the first extent of the first logical device.

5. The method of claim 4, wherein said first processing further comprises:

determining the first offset using the base address for the first logical device and using the target logical address of the log record for the write I/O operation, wherein the base address is determined by said first processing.

6. The method of claim 5, further comprising:

storing at least one of the base address, the first offset and the extent size as first metadata associated with the first logical device.

7. The method of claim 6, further comprising:

performing recovery processing using the at least one of the base address, the first offset and the extent size stored as the first metadata associated with the first logical device, wherein the recovery processing includes recovering second metadata of the file system.

8. The method of claim 7, wherein the second metadata is included in an index node (inode) of the file system, wherein the inode is uniquely associated with the file used to implement the first logical device.

9. The method of claim 8, wherein prior to performing said receiving, said storing and said first processing, the method includes performing other processing comprising:

creating a file system object in the file system for the first logical device, wherein said creating the file system object includes:

creating the inode and mapping the inode into the file system logical address space; and allocating the first extent and mapping the first extent into the file system logical address space.

10. The method of claim 5, further comprising:

performing verification processing or consistency checking in connection with the first logical device, wherein said verification processing or consistency checking uses at least one of the base address, the first offset and the extent size as first metadata associated with the first logical device.

11. The method of claim 1, wherein said first processing includes committing a first transaction of a plurality of write I/O operations including the write I/O operation.

12. The method of claim 11, wherein said committing the first transaction includes writing a plurality of log records, including the log record, to the log file, and wherein the method includes:

responsive to committing the first transaction whereby the plurality of log records have been written to the log file, sending a response to a client that requested the first transaction has completed.

13. The method of claim 2, wherein the file system logical address space is a range of logical addresses from a starting address to an ending address, wherein a binary logarithm of the ending address is J, and wherein the first value is stored in a field of the log record for the write I/O operation and the first field has a size determined in accordance with J.

14. The method of claim 2, wherein the extent size is a power of 2.

15. The method of claim 14, wherein the extent size is greater than a specified minimum extent size, and wherein the minimum extent size is a power of 2.

16. The method of claim 15, wherein a base address in the file system logical address space for the first logical device denotes a starting logical address in the file system logical address space for the first logical device, and wherein the base address is a power of 2 and wherein the base address is an integer multiple of the extent size of the first logical device.

17. A system comprising:

one or more processors; and a memory comprising code stored thereon that, when executed, performs a method of processing I/O operations comprising:

receiving a write I/O operation that writes first data to a target location, wherein the target location is represented as a first logical device and a first offset within a first logical address space of the first logical device;

storing a log record for the write I/O operation in a log file, wherein the log record includes log data and a log descriptor, wherein the log data includes the first data, wherein the log descriptor includes a target logical address for the target location in a file system logical address space, wherein the target logical address is determined by mapping the target location to a corresponding logical address in the file system logical address space, wherein the log descriptor includes a first value denoting the binary logarithm of an extent size of the first logical device; and performing first processing of the log record, wherein said first processing includes flushing the log record from the log file to store the first write data of the log record on a first extent of physical storage provisioned for the first logical device.

18. A non-transitory computer readable medium comprising code stored thereon that, when executed, performs a method of processing I/O operations comprising:

receiving a write I/O operation that writes first data to a target location, wherein the target location is represented as a first logical device and a first offset within a first logical address space of the first logical device;

storing a log record for the write I/O operation in a log file, wherein the log record includes log data and a log descriptor, wherein the log data includes the first data, wherein the log descriptor includes a target logical address for the target location in a file system logical address space, wherein the target logical address is determined by mapping the target location to a corresponding logical address in the file system logical address space, wherein the log descriptor includes a first value denoting the binary logarithm of an extent size of the first logical device; and performing first processing of the log record, wherein said first processing includes flushing the log record from the log file to store the first write data of the log record on a first extent of physical storage provisioned for the first logical device.

19. The non-transitory computer readable medium of claim 18, wherein the extent size denotes a size of the first extent of physical storage allocated for storing content of the first logical device, and wherein the first extent is mapped to a subrange of the file system logical address space.

20. The non-transitory computer readable medium of claim 19, wherein the first logical device is implemented as a file in a file system having the file system logical address space.

* * * * *